United States Patent [19]

Morikawa

[11] Patent Number: 5,703,693
[45] Date of Patent: Dec. 30, 1997

[54] DIGITAL COPY MACHINE ALLOWING DUPLEX COPYING IN SHORT TIME THROUGH NOVEL RECIRCULATION TIMING

[75] Inventor: Takeshi Morikawa, Toyokawa, Japan

[73] Assignee: Minolta Co., Ltd., Osaka, Japan

[21] Appl. No.: 358,860

[22] Filed: Dec. 19, 1994

[30] Foreign Application Priority Data

May 2, 1994 [JP] Japan .................................. 6-093508

[51] Int. Cl.⁶ .................................................. G03G 15/00
[52] U.S. Cl. .......................... 358/296; 399/364; 399/370; 399/384
[58] Field of Search ....................... 358/401, 444, 358/468, 448, 450, 296, 474, 496, 498; 355/77, 24, 23, 318, 319, 320, 233, 244, 204; 382/312, 319; 399/361, 364, 363, 370, 373, 374, 376, 389

[56] References Cited

U.S. PATENT DOCUMENTS

| 5,095,342 | 3/1992 | Farrell et al. ........................ 355/319 |
| 5,105,283 | 4/1992 | Forest et al. ........................ 358/401 |
| 5,159,395 | 10/1992 | Farrell et al. ........................ 355/319 |
| 5,184,185 | 2/1993 | Rasmussen et al. .................. 355/308 |
| 5,333,057 | 7/1994 | Morikawa et al. ................... 358/296 |
| 5,337,135 | 8/1994 | Malachowski et al. ............... 355/319 |
| 5,418,607 | 5/1995 | Tani ..................................... 355/319 |
| 5,467,182 | 11/1995 | Hower, Jr. et al. .................. 355/319 |
| 5,473,419 | 12/1995 | Russel et al. ........................ 355/319 |
| 5,475,475 | 12/1995 | Kohtani et al. ...................... 358/296 |
| 5,491,557 | 2/1996 | Nakajima et al. .................... 358/296 |
| 5,537,196 | 7/1996 | Matsumoto et al. .................. 355/320 |
| 5,604,577 | 2/1997 | Wakuda et al. ...................... 399/364 |

*Primary Examiner*—Peter S. Wong
*Assistant Examiner*—Derek J. Jardieu
*Attorney, Agent, or Firm*—Sidley & Austin

[57] ABSTRACT

A digital copy machine includes an image reading unit IR, an image memory, an image formation unit PRT, and a circulation type sheet transportation mechanism having a transportation path of a length that can accommodate n (n≧2) sheets for reversing the side of the sheet having a copy image formed on one side to the opposite side and refeeding the same to a copy position. In duplex copying using at least n sheets, the timing of feeding the first sheet is set so that the n-th sheet arrives at the copy position only after the time when the copy of an original image of the (2n−1)th page can be initiated in order to set the number of circulating sheets to n.

26 Claims, 28 Drawing Sheets

```
┌─────────────────────────┐
│                     Q11 │
│  ENTER NUMBER OF        │
│  ORIGINALS              │
│                         │
│   SET        1 COPY     │
│                         │
└─────────────────────────┘
  Z11
```

```
┌─────────────────────────┐
│                     Q12 │
│  NUMBER OF              │
│  ORIGINALS SET          │
│                         │
│              20 COPIES  │
│                         │
└─────────────────────────┘
```

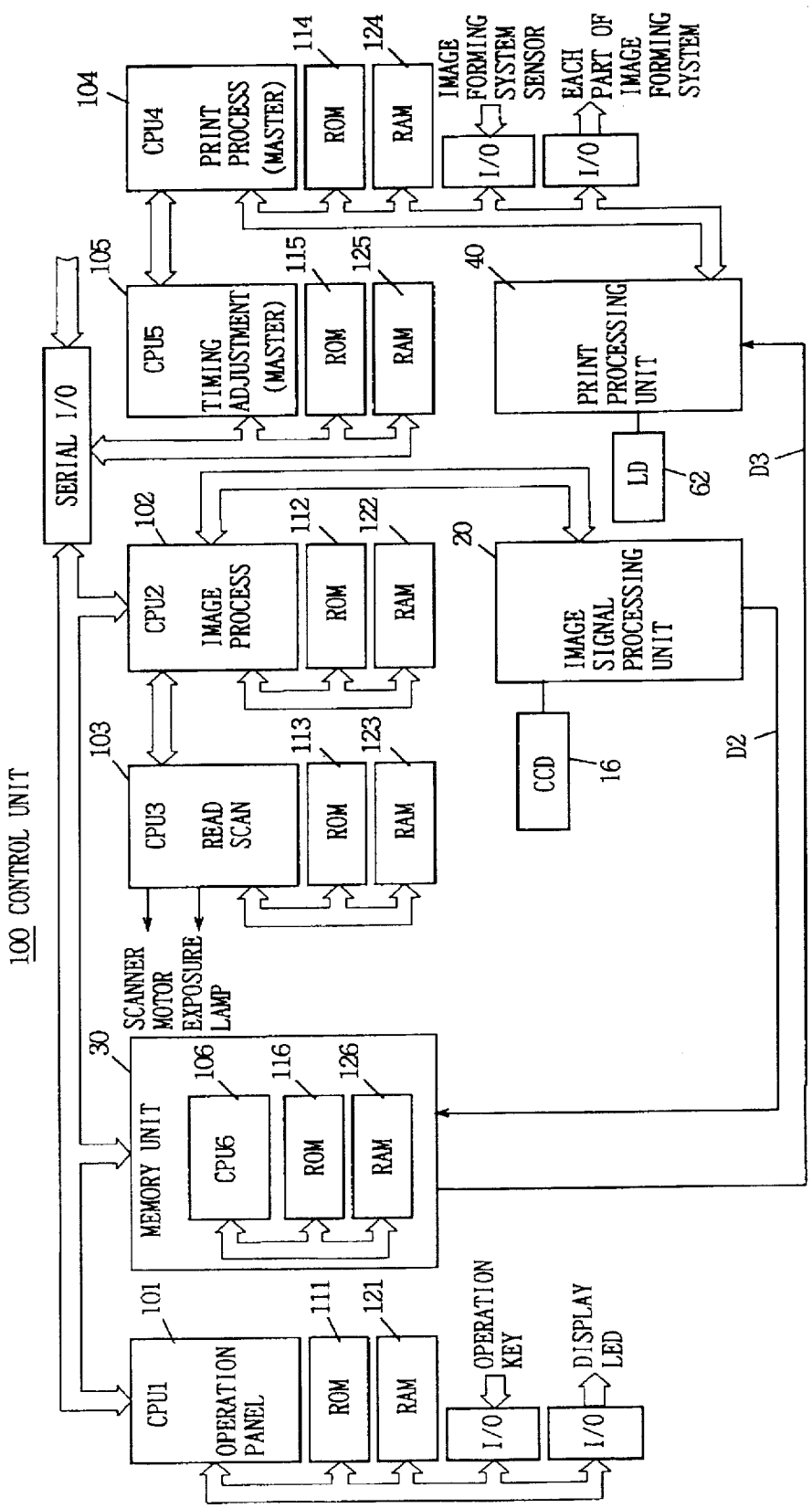

MEMORY MODE WRITING OPERATION

MEMORY MODE READING OPERATION

INITIAL STATE

REGISTRATION OF
PAGE NUMBER

UPDATE OF
REGISTRATION POINTER

REGISTRATION OF
PAGE NUMBER

UPDATE OF
REGISTRATION POINTER

READ OUT OF
PAGE NUMBER(FIRST TIME)

UPDATE OF
READOUT POINTER

READ OUT OF
PAGE NUMBER

UPDATE OF
READOUT POINTER

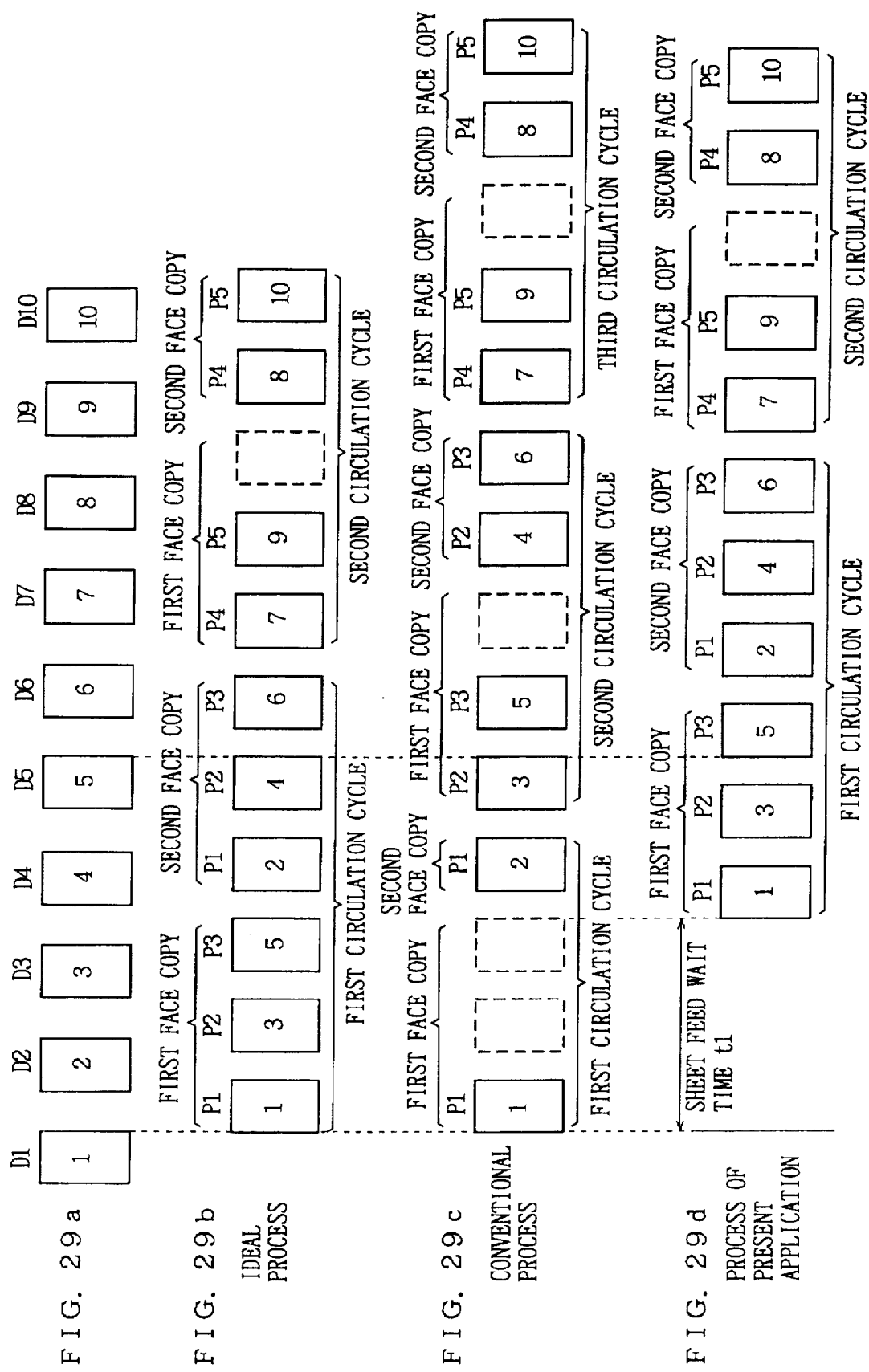

DIGITAL COPY MACHINE ALLOWING DUPLEX COPYING IN SHORT TIME THROUGH NOVEL RECIRCULATION TIMING

BACKGROUND OF THE INVENTION

1. Field of the Invention

The present invention relates to digital copy machines, and more particularly, to a digital copy machine including duplex copying function to print out a copy image on opposite sides (first face and a second face) of a sheet.

2. Description of the Background Art

Duplex copying is generally performed by sequentially copying the first face and then copying of a second face on the top side face and the back side face on a single sheet. Therefore, a sheet transportation mechanism is incorporated in a copy machine to reverse the side of the first face of a sheet (for example, a paper sheet) having copying completed and refeeding the sheet to a copy position. By using an automatic duplexing document feeder, automatic duplex copying can be obtained not only for a simplex original, but also for a duplex original.

In a digital copy machine including an image memory for storing an original image of a predetermined number of pages, a plurality of originals can be copied on a sheet in a sequence differing from the read out sequence of the plurality of original images. This type of copy machine carries out duplex copying efficiently by using a circulation type sheet transportation mechanism guiding a sheet to the copy position with no intermediate halting and setting the transportation path thereof to a length in which circulation of a plurality of sheets is possible.

More specifically, the time required for the entire copy operation can be reduced by carrying out copying, not alternately for one side and then the other side for every sheet, but copying respective one sides and then other sides of a group of a plurality of sheets.

FIGS. 29a–29d are diagrams for describing an example of duplex copying. The x axis represents time sequence. In the drawings, ten sheets of one-sided originals D1–D10, i.e. original images of ten pages, are copied onto both sides of five sheets P1–P5. The number of sheets in one circulation differs depending upon the size of the sheet. Here, the number of sheets in 1 circulation is 3. In the present specification, the term "page" implies the processing unit of reading and printing, and is not related to the "nombre" in books or the like (the so-called page number).

The image of each of originals D1–D10 is continuously read one by one as shown in FIG. 29a to be quantized into digital image data. The image data is sequentially compressed and temporarily stored in an image memory in the unit of pages. Concurrently, image data of a predetermined page is read out from the image memory to be printed on a sheet as a copy image.

Ideally, as shown in FIG. 29b, three sheets P1–P3 are circulated, whereby the original images read out in the odd number order (the first, third, and fifth read out original images) and the even number order (the second, fourth, and sixth read out original images) are copied on the opposite sides of the sheets. Then, the remaining two sheets P4 and P5 are circulated for duplex copying of the seventh to tenth read out original images.

In this case, there is a possibility that the read out timing and the printing timing do not match depending upon the reading speed and printing speed (sheet transportation speed) thereof. For example, even if the sheet feed initiate timing of the first sheet P1 is set succeeding the completion of reading the original image of one page which is to be copied on sheet P1, the reading of the third original D3 may be too late for the first face copy of the second sheet P2 (the printing of the third page) as shown in FIG. 29b.

Conventionally, duplex copying was controlled so that printing was carried out first onto a number of sheets fewer than the maximum number of sheets in one circulation (here, one sheet P1), followed by printing onto two sheets P2 and P3, followed by the printing onto the remaining two sheets P4 and P5, as shown in FIG. 29c.

In a circulation type sheet transportation mechanism, the time period from the first face copy of the head sheet in one circulation to a second face copy, i.e. the time period of one circulation, is constant regardless of the number of sheets to be circulated. In other words, the time when copying of the second face of the head sheet is enabled is identical in both the cases where the number of sheets circulated is less than the maximum number of sheets, and where the maximum number of sheets are circulated.

In the conventional case, the initial number of sheets to be circulated is made less than the maximum number of sheets, so that the number of times of sheet circulation (the repeated number of times of the first face and the second face copying) increases. Therefore, the entire time required for the complete duplex copying starting from readout of an original to the discharge of the last sheet becomes longer, resulting in reduction of the productivity of the copy results.

SUMMARY OF THE INVENTION

In view of the foregoing, an object of the present invention is to reduce the time required for duplex copying in a digital copy machine having duplex copying function.

Another object of the present invention is to reduce the time required for duplex copying with a simple structure in a digital copy machine having duplex copying function.

In a digital copy machine according to the present invention, n sheets are continuously fed to a copy position in duplex copying that uses at least n sheets. Following the copying to the first faces, the sheets are reversed to the opposite side by the sheet transportation mechanism to be fed to the copy position again for copying to the second faces. As shown in FIG. 29d, the feeding timing of the first sheet is set so that the n-th sheet arrives at the copy position only after copying of the original image of the (2n−1)th page can be initiated. As a result, the time required for duplex copying in a digital copy machine having a duplex copy function can be reduced.

Preferably, the feeding timing of the first sheet is delayed by time t1 as shown in FIG. 29d. As a result, the time required for duplex copying can be reduced with a simple structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 and FIG. 5 are block diagrams showing the structure of the control unit of the copy machine.

FIGS. 29a–29d schematically show examples of duplex copying.

DESCRIPTION OF THE PREFERRED EMBODIMENTS

Figure 1:
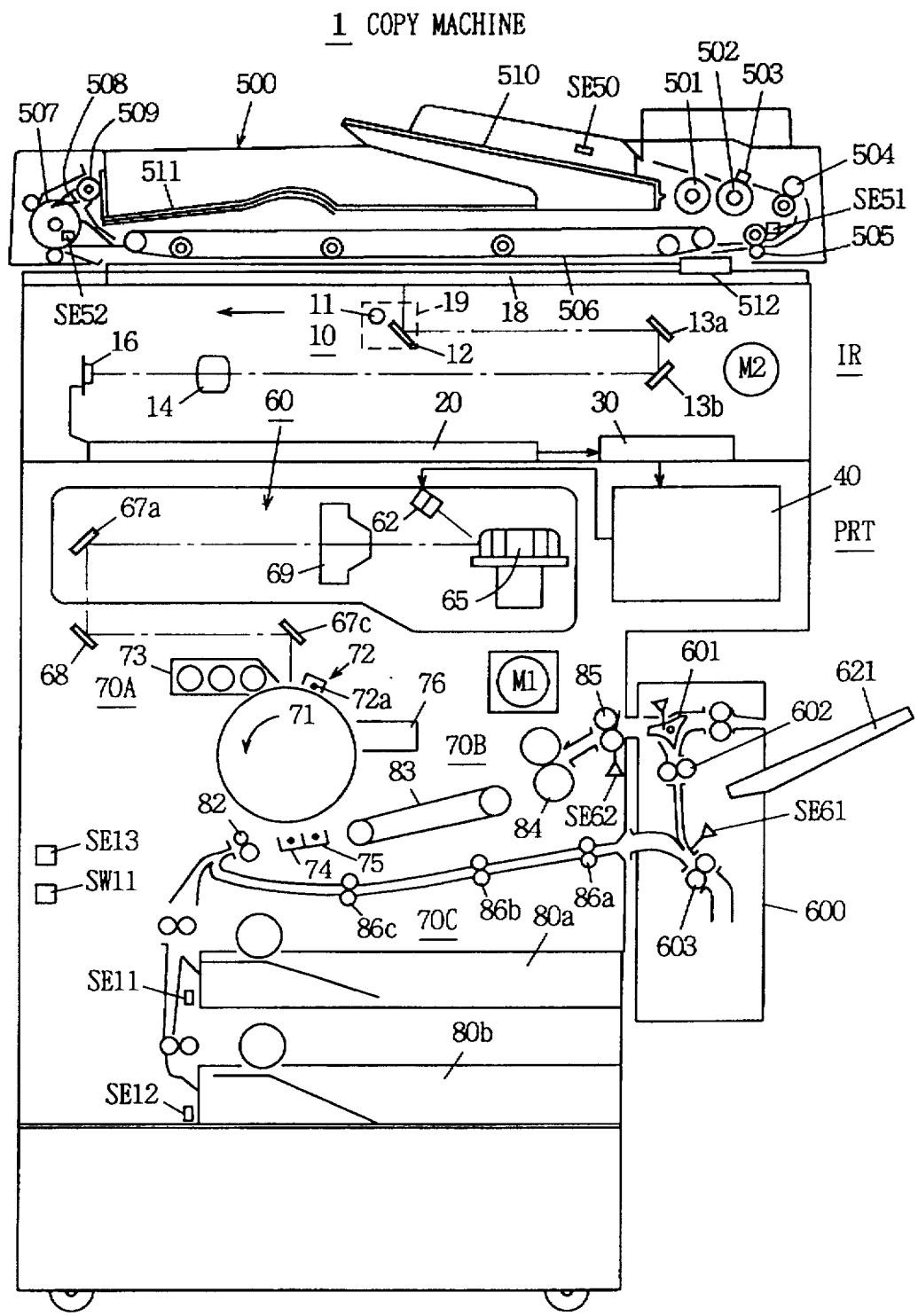
FIG. 1 is a front sectional view of a copy machine showing the entire structure according to the present invention.

Referring to FIG. 1, a copy machine 1 according to the present invention includes an image reader IR and a page printer PRT.

The main body of image reader IR includes a scanning system 10 for converting an original mounted on a platen glass 18 into pixels and reading out the same, an image signal processing unit 20 for quantizing a photoelectric conversion signal output from scanning system 10 and for carrying out a signal process according to various image formation modes, and a memory unit 30 for storing image data corresponding to the original. An automatic duplexing document feeder (ADDF) 500 which is an additional device with an original cover at the top of the main body is attached in an openable manner with the trailing edge portion as the fulcrum.

Scanning system 10 is an image reading mechanism of a line scanning system, including a scanner 19, an image sensor 16, and a scan motor M2. Scanner 19 includes a lamp 11 for exposing an original and a mirror 12. Image sensor 16 includes fixed mirrors 13a and 13b, converge lens 14, and a CCD array. Scan motor M2 drives scanner 19. The details of image signal processing unit 20 and memory unit 30 will be described afterwards.

ADDF 500 conveys an original set on an original stocker 510 to platen glass 18 by means of a sheet feed roller 501, a sort roller 502, a sort pad 503, an intermediate roller 504, a resist roller 505, and a transport belt 506. An original subjected to a readout is discharged on a document discharge tray 511 by a discharge roller 509. ADDF 500 includes an original scale 512, an original sensor SE50 for detecting the presence of an original, an original size sensor SE51, and a discharge sensor SE52.

In copying a plurality of sheets of originals, the operator stacks the originals right side up. Each original on original stocker 510 is drawn out from the bottom of the stack one by one to be accurately set at the reading position on platen glass 18 presented face down. In the case of a simplex (one-sided) original mode, the read out original is transported to the leftwards in the drawing to be discharged with the right side up. In the case of a duplex original mode, the original is moved left after readout of the first face and is reversed to the opposite side by reversing roller 507 to be returned to the reading position on platen glass 18. This original is sent to the left again after the readout of the second face side to be discharged.

Page printer PRT includes a print processing unit 40 for providing an exposure control signal, a print head 60 using a semiconductor laser 62 as a light source, a develop.transfer system 70A with a photoreceptor drum 71 and peripheral devices, a fixing-discharging system 70B having a pair of fixing rollers 84 and a discharge roller 85, and a circulation type sheet transportation system 70C including a sheet refeeding unit 600. Page printer PRT prints out a copy image by an electrophotographic process according to image data from image reader IR. Below page printer PRT are provided two sheet cassettes 80a and 80b which can contain approximately several hundred sheets, sheet size sensors SE11 and 12, and a roller group for sheet feeding.

A laser beam emitted from semiconductor laser 62 is deflected towards the main scanning direction by a polygon mirror 65 to be guided to the exposure position of photoreceptor drum 71 via a main lens 69 and various mirrors 67a, 68, and 67c. The surface of photoreceptor drum 71 is uniformly charged by a corona charger 72. The latent image formed by exposure is converted into a toner image via developing unit 73. The toner image is transferred onto a sheet by transfer charger 74 at the transfer position (copy position). The sheet is separated from photoreceptor drum 71 by a separation charger 75 to be conveyed to fix roller 84 by transport belt 83, and then discharged with the face up.

Sheet refeeding unit 600 is attached at the side face of page printer PRT as an additional device for automating duplex copying. Sheet refeeding unit 600 temporarily stores a sheet discharge from the main body of page printer PRT by discharge roller 85 and then returns the sheet to page printer PRT according to a switch back transportation.

In a simplex copy mode, the sheet passes through sheet refeeding unit 600 to be discharged on discharge tray 621. In a duplex copy mode, the left end of a switching claw 601 moves upwards by a solenoid not shown, and the sheet discharged by discharge roller 85 arrives at positive reversing roller 603 through transport roller 602. When the trailing edge of the sheet reaches sheet sensor SE61, the forward/ reversing roller 603 is reversed. This causes the sheet to be returned to the main body of page printer PRT. The returned sheet is conveyed to timing roller 82 via horizontal transport rollers 86a, 86b and 86c in sequence to attain a standby state. When a plurality of sheets are continuously fed, the sheets are sent to sheet refeeding unit 600 sequentially with a predetermined interval between the sheets so each sheet will not overlap the next one. Because the length of the transportation path of the sheet is constant, the number of sheets of 1 circulation (the maximum number of circulation sheets) according to sheet refeeding unit 600 and horizontal transport rollers 86a–86c depends upon the size of the sheet.

Figure 2:
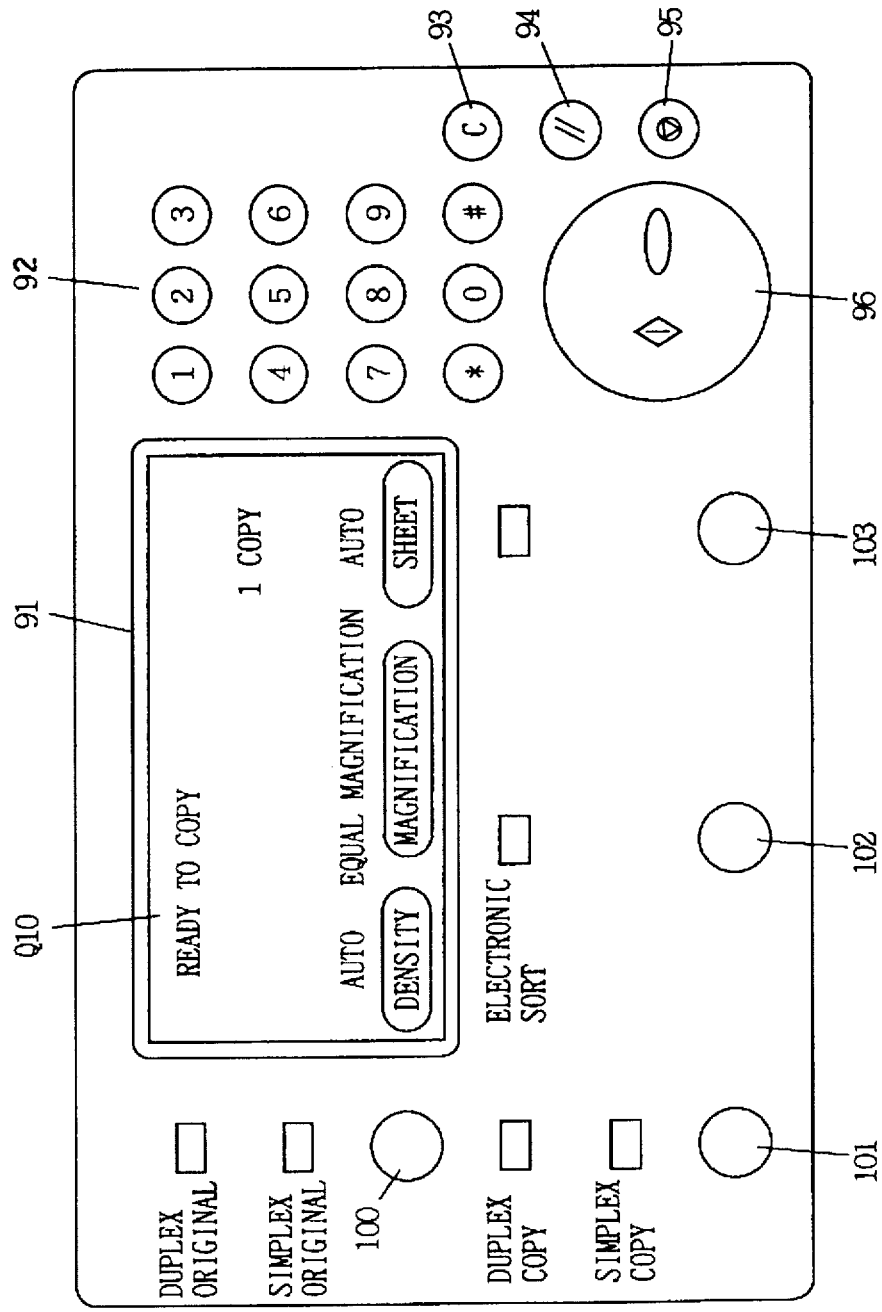
FIG. 2 is a top view of an operation panel.
Figures 3A, 3B:
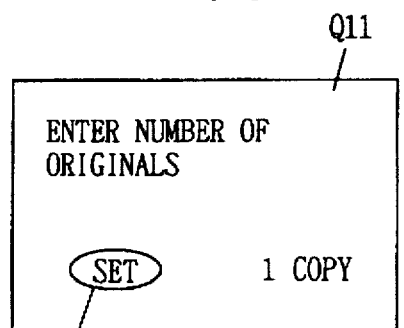
FIGS. 3a and 3b show operation screens.

FIG. 2 is a plan view of an operation panel OP, and FIGS. 3a and 3b show operation screens.

Operation panel OP includes a liquid crystal touch panel 91 for status display and specification of various modes, a ten key 92 for entering numerical conditions for copy (number of copies, magnification, and the like), a clear key 93 for resetting the numerical conditions to standard values, a panel reset key 94 for initializing the copy mode, a stop key 95 for instructing suspension of a copy, a start key 96 for instructing copy initiation, an original specify key 100 for specifying a simplex original or a duplex original, a copy mode key 101 for switching between a simplex copy and a duplex copy, a finishing mode key 102 for specifying electronic sorting, and an input mode key 103 for specifying the number of originals. Electronic sorting is the function of repeating M times the operation of printing one at a time the original of each page for producing M copy representations when in a multicopy mode in which the same original is printed out for M copies (M≧2) when there are a plurality of originals (for example, 3 pages of originals). In a non-electronic sorting mode, each original is printed for M times in the order that they are read out.

When an initial screen Q10, for example, is displayed on liquid crystal touch panel 91, the depression (ON) of input mode key 103 by the operator will set the input mode to the number of original input mode, whereby a message screen Q11 is displayed as shown in FIG. 3a prompting the setting of the number of originals instead of initialization screen Q10. By using ten key 92 and turning on button Z11 on the screen, the number of originals can be specified. The operator enters a numeric value, whereby a screen Q12 indicating completion of setting as shown in FIG. 3b is displayed instead of message screen Q11.

Figure 5:
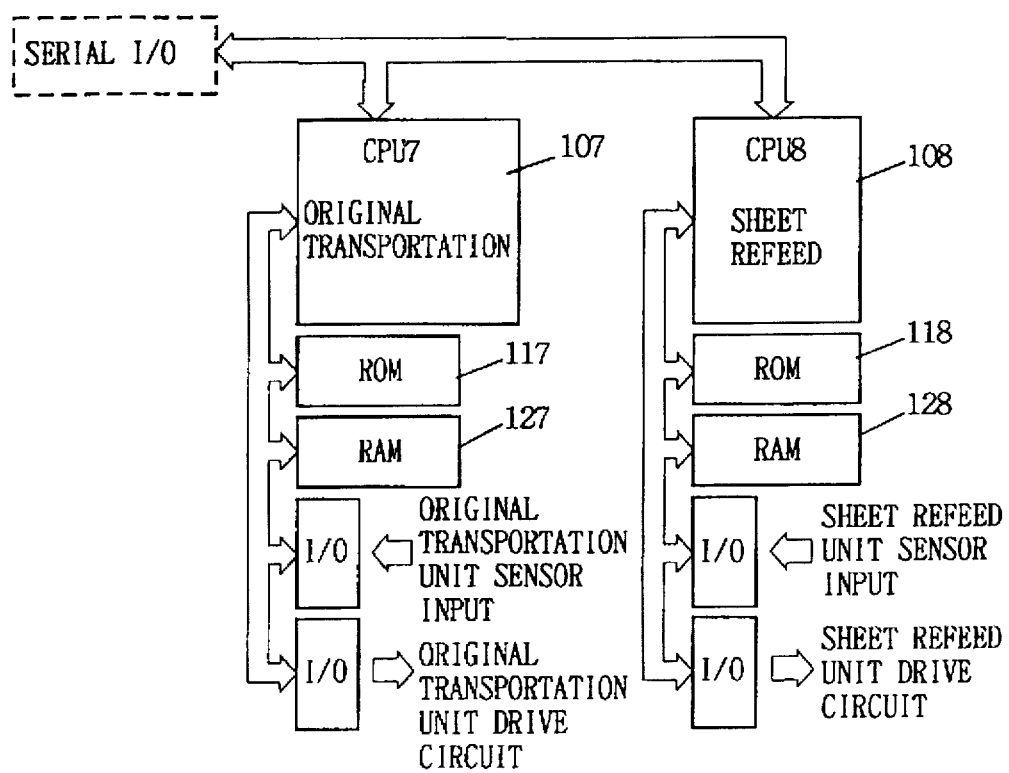

FIGS. 4 and 5 are block diagrams showing a structure of control unit 100 of copy machine 1.

Control unit 100 includes eight CPU 101–108. CPU 101–108 include ROM 111–118, respectively, and RAM 121–128, respectively. Each ROM stores a program, and each RAM becomes the work area for program execution. It is to be noted that CPU 106 is provided in memory unit 30.

CPU 101 controls signal input and display from various operation keys of operation panel OP. CPU 102 controls each component of image signal processing unit 20. CPU 103 controls the drive of scanning system 10. CPU 104 controls the entire page printer PRT including print processing unit 40.

CPU 105 carries out the processes for adjusting the entire timing of control unit 100 and the set up of the operation mode. CPU 105 carries out serial communication with other CPUs to transmit/receive commands and reports required for the control.

CPU 106 carries out control of storing and reading image information. CPU 107 controls the original transportation by ADDF 500. CPU 108 controls sheet refeeding unit 600.

Figure 6:
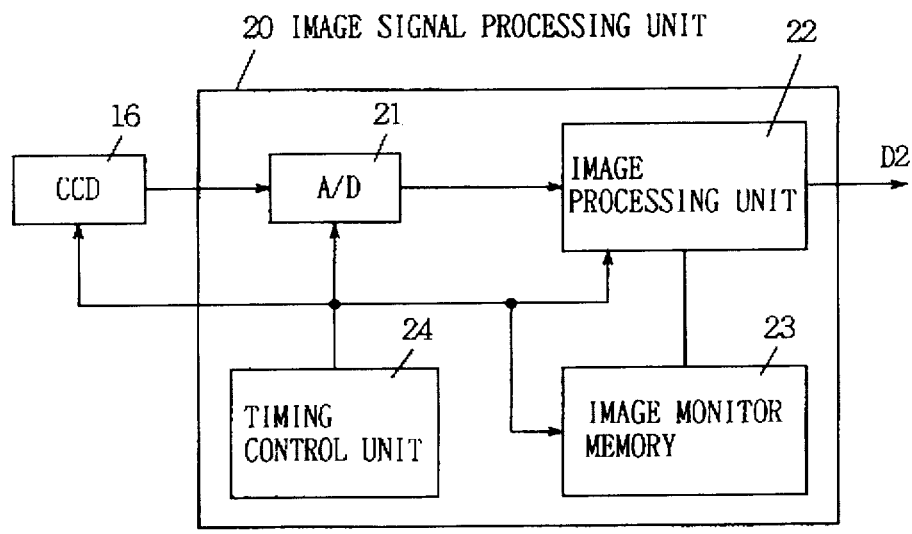
FIG. 6 is a block diagram showing a structure of an image signal processing unit.

FIG. 6 is a block diagram showing a structure of image signal processing unit 20.

Image signal processing unit 20 includes an A/D converting unit 21, an image processing unit 22, an image monitor memory 23, and a timing control unit 24 for providing a synchronizing signal for the operation of various components.

A/D converting unit 21 quantizes a photoelectric conversion signal of image sensor 16 to convert the same into image data of 8 bits (256 tones). Image processing unit 22 carries out various image processes such as shading correction, MTF correction, gamma correction, variable scale magnification, and the like. The processed image data D2 is output as readout information. Image monitor memory 23 is used for storing sample data and the like for shading correction.

Figure 7:
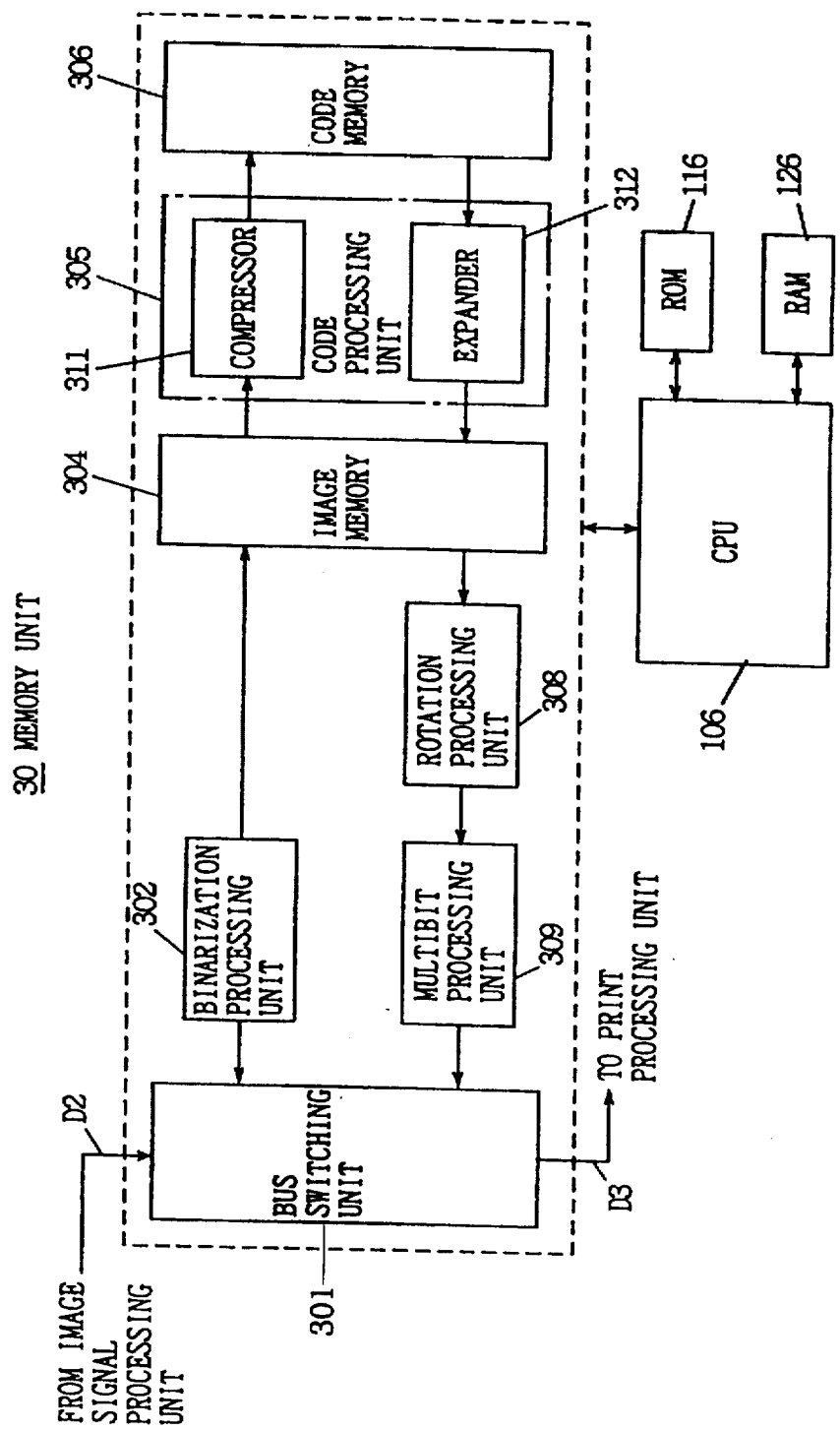
FIG. 7 is a block diagram showing a structure of a memory unit.

FIG. 7 is a block diagram showing the structure of memory unit 30.

Memory unit 30 includes a bus switching unit 301, a binarization processing unit 302, a multi-port image memory 304, a code processing unit 305 having a compressor 311 and an expander 312, a multiport code memory 306, a rotation processing unit 308, a multi-bit processing unit 309, and the aforementioned CPU 106. Image information is stored in a compressed manner to reduce the capacity of the memory. Image memory 304 has a capacity that can store two pages of image data read out at the resolution of 400 dpi.

In the copy operation of a memory mode where image read out by an original scanning is temporarily stored, image data D2 of 8 bits is applied from image signal processing unit 20 to binarization processing unit 302 of memory unit 30 via bus switching unit 301. Binarization processing unit 302 converts multibit image data D2 into binary image data in a restorable range by, for example, a dither method. The binarized image data is temporarily written into image memory 304.

Code processing unit 305 reads out image data written in image memory 304 and compresses the same to produce code data (compressed data). This data is written into code memory 306. Code processing unit 305 reads out from code memory 306 the code data to be printed. The expanded image data is written into image memory 304. Compressor 311 and expander 312 are formed so that they are operable concurrently and independent of each other to improve the copy speed. DMA transfer is carried out between code processing unit 305 and code memory 306 by means of a DMA controller not shown.

When image data of 1 page is reproduced by expansion, that data is read out from image memory 304 and subjected to a rotation process if necessary, and then restored to multibit image data by multibit processing unit 309. The multibit image data is transferred to print processing unit 40 as exposure control data.

During the above-described temporarily storage of original image, code memory 306 is controlled by a management table MT1 provided in RAM 126.

Figure 8A:
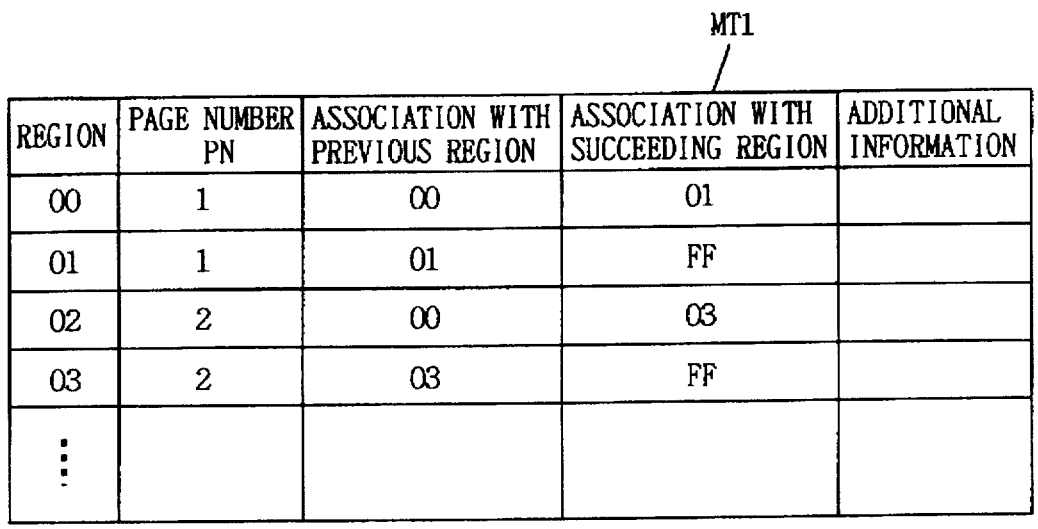
FIGS. 8a and 8b shows the relationship between a management table and a code memory.
Figure 8B:
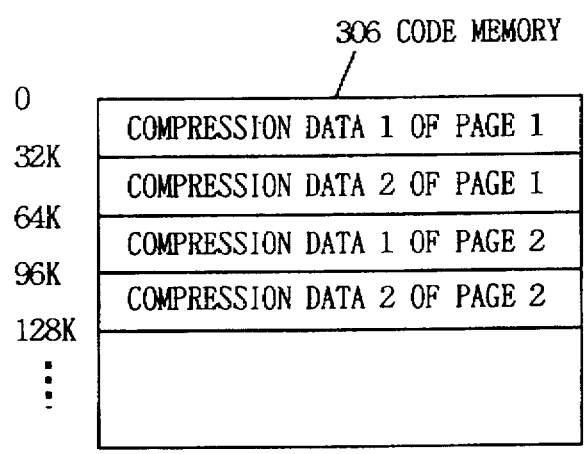

FIG. 8 shows the relationship between management table MT1 and code memory 306.

Code memory 306 is divided into memory regions of 32K bytes. Code data for every page is stored in respective regions taking into consideration simultaneous control of writing (during reading) and read out (during printing).

Management table MT1 stores a number indicating a region in code memory 306, a page number PN (original image number) of image data applied in the writing sequence (the scanning order of the original), the number of an associating region, and various additional information required for the compression system and the compression/expansion process of the data length and the like. Code memory 306 is controlled dynamically according to these information.

The "association with previous region" in FIG. 8a indicates the connection of each region of 32K bytes in the preceding direction in each page. The value of "00" indicates that it is the first storage region of the data of one page, and values other than "00" indicates the proceeding connected region. Similarly, "association with succeeding region" indicates the connection in the succeeding direction. The value of "FF" indicates that it is the last region in the page, and values other than "FF" indicate the number of the succeeding region.

During read out and compression of image data from image memory 304, CPU 106 controls compressor 311 to store the compressed data into code memory 306 while creating information of management table MT1. When image data is to be output, an operation opposite thereto is carried out to read out code data from code memory 306. The information in management table MT1 is erased when the information of a relevant page is properly read out and the specified number of copies M is completed.

The operation sequence of copy machine 1 in a memory mode will be described hereinafter focusing on a request command (Q), report (A), and data flow between CPU 101–106.

Figure 9:
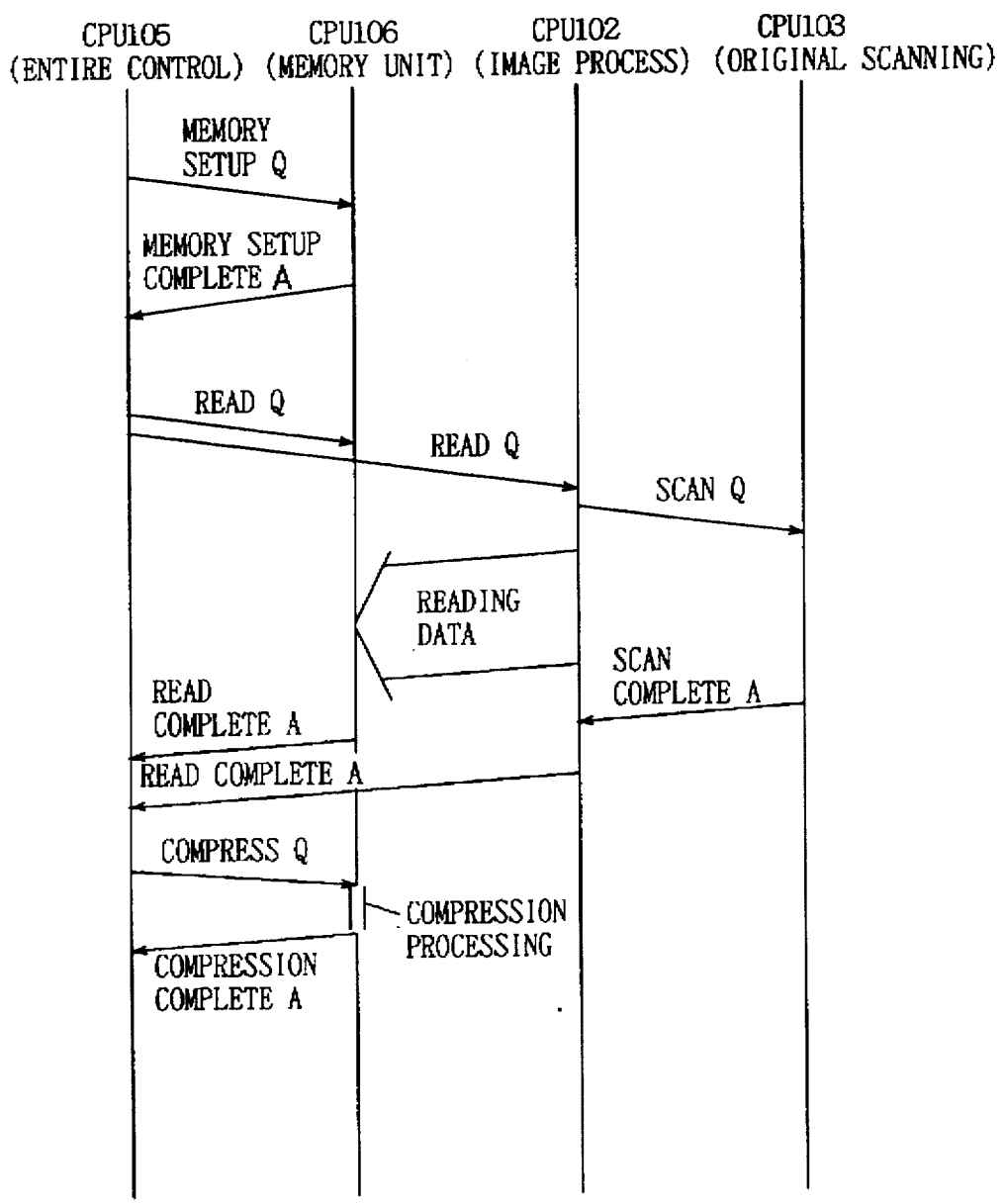
FIG. 9 shows a sequence of a memory mode writing operation.

FIG. 9 schematically shows the sequence of a memory mode writing operation.

In a memory mode writing operation, image data is transferred to image memory 304 from image signal processing unit 20.

First, CPU 105 controlling the entire sequence requests the memory to be set up for CPU 106. In response, CPU 106 sets the bus connection state for transferring image data D2 from image signal processing unit 20 to image memory 304, sets the mode for binarization (for example threshold value and binarization threshold value for error diffusion process, base erasure), and sets the write region start address and XY length information to image memory 304 for the internal hardware.

When these specifications are completed, CPU 106 notifies completion of a memory set up with respect to CPU 105. CPU 105 requests readout to CPU 106 and CPU 102, whereby CPU 102 requests scanning to CPU 103.

Then, CPU 103 initiates scanning. When scanner 19 arrives at the image region of the original, readout data (image data D2) is transferred from image signal processing unit 20 to memory unit 30 according to the image process mode set by CPU 102.

When scanning ends and completion of readout is signaled from CPU 102 and CPU 106, CPU 105 requests data compression to CPU 106. In response, CPU 106 sets the readout address from image memory 304, XY length information, the write address to code memory 306, the mode of compressor 311 (for example, MH method), and the like, to actuate each component. A compression process is carried out, and the code data is stored in code memory 306.

When the compression process is finished, CPU 106 notifies to CPU 105 completion of the compression process. If code memory 306 is full here, a compression completion report including a parameter indicating compression disable is sent to CPU 105. As a result, CPU 105 is notified that code memory 306 is full.

Figure 10:
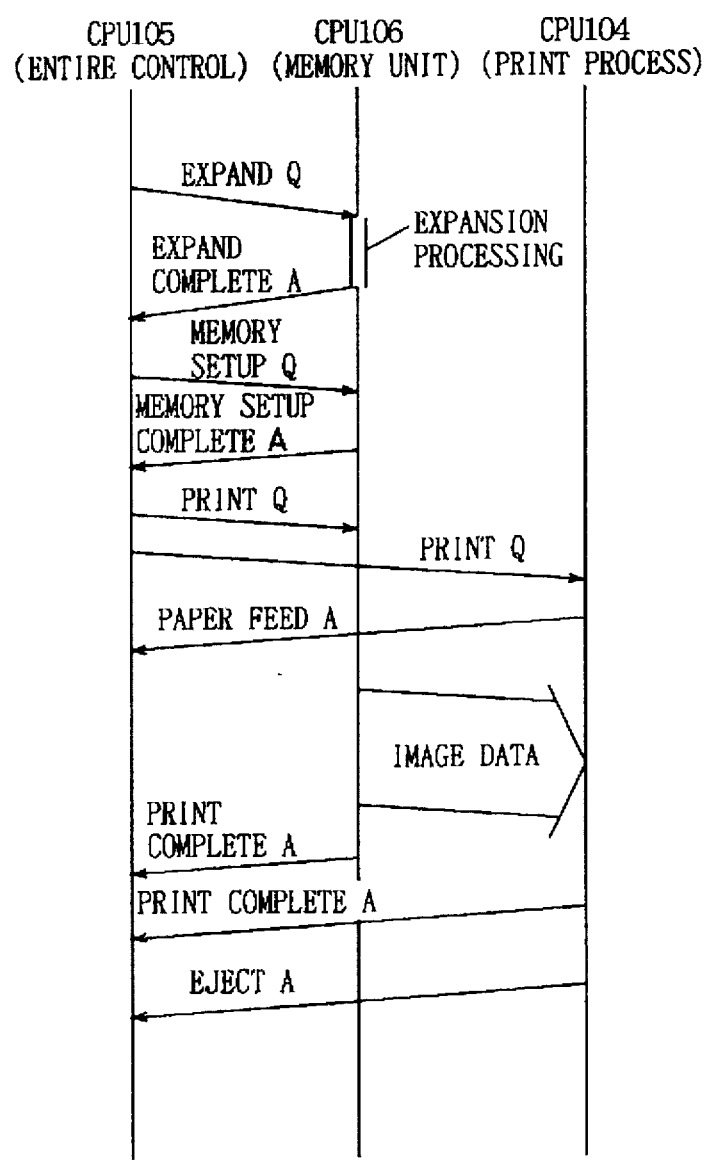
FIG. 10 shows a sequence of a memory mode reading operation.

FIG. 10 schematically shows the sequence of a memory mode reading operation.

In a memory mode reading operation, image data is read from image memory 304, whereby a copy image is printed on a sheet according to the image data.

CPU 105 requests data expansion to CPU 106. CPU 106 sets the readout address from code memory 306, the amount of data, the writing address to image memory 304, XY length information, the mode of expander 312 (for example, MH method), and the like, to actuate each component. An expansion process is carried out, and the image data is written into image memory 304.

When an expansion process is completed, CPU 105 requests memory set up to CPU 106 to read out image data from image memory 304. In response, CPU 106 sets the bus connection state for providing image data D3 from image memory 304 to print processing unit 40, sets a rotation process if necessary, sets a reading region start address of image memory 304 and XY length information with respect to the internal hardware.

When CPU 105 is notified that the set up has been completed, CPU 105 requests printing to CPU 106 and CPU 104. A sheet feed report indicating the sheet transportation state is sent from CPU 104 to CPU 105. Then, image data D3 read out from image memory 304 is provided to print processing unit 40 to be printed out.

When printing is completed, CPU 106 and CPU 104 send a print completion report and an eject completion report to CPU 105. Upon receiving these reports, CPU 105 sends a memory clear request to CPU 106 if necessary.

The operation of copy machine 1 will be described in further details mainly on control of duplex copying (duplex copy mode) which is the feature of the present invention according to the flow chart.

Figure 11:
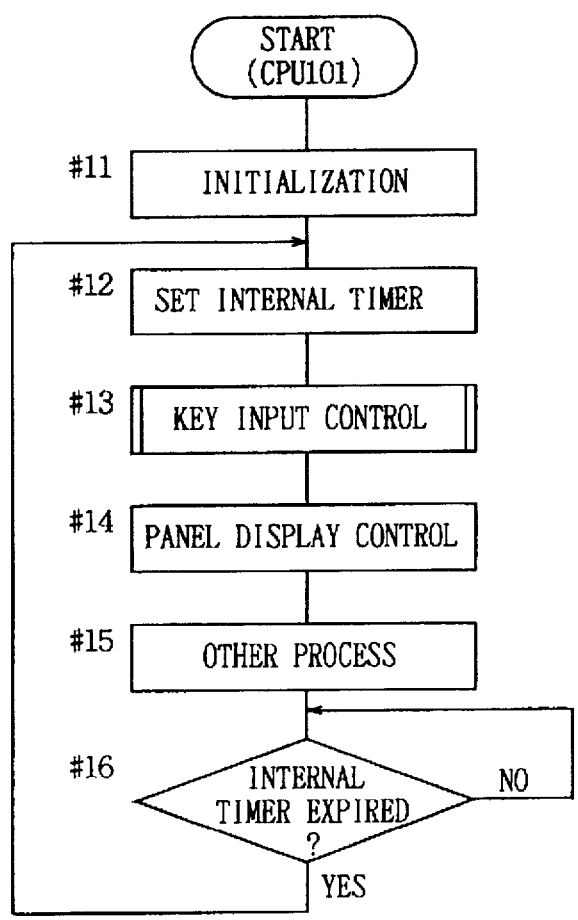
FIG. 11 is a CPU main flow chart that controls the operation panel.

FIG. 11 is the main flow chart of CPU 101 controlling operation panel OP.

When power is turned on, CPU 101 carries out initialization to initialize RAM 121, the register, and the like (#11). Then, an internal timer defining the length of 1 routine is set (#12), followed by a key input process (#13) for accepting a key operation, a panel display process (#14) for effecting display according to the operation, other processes (#15), and waiting for the expiration of the internal timer (#16). The processes of #12–#16 are repeated. Furthermore, communication with another CPU is carried out appropriately as an interruption process.

Figure 12:
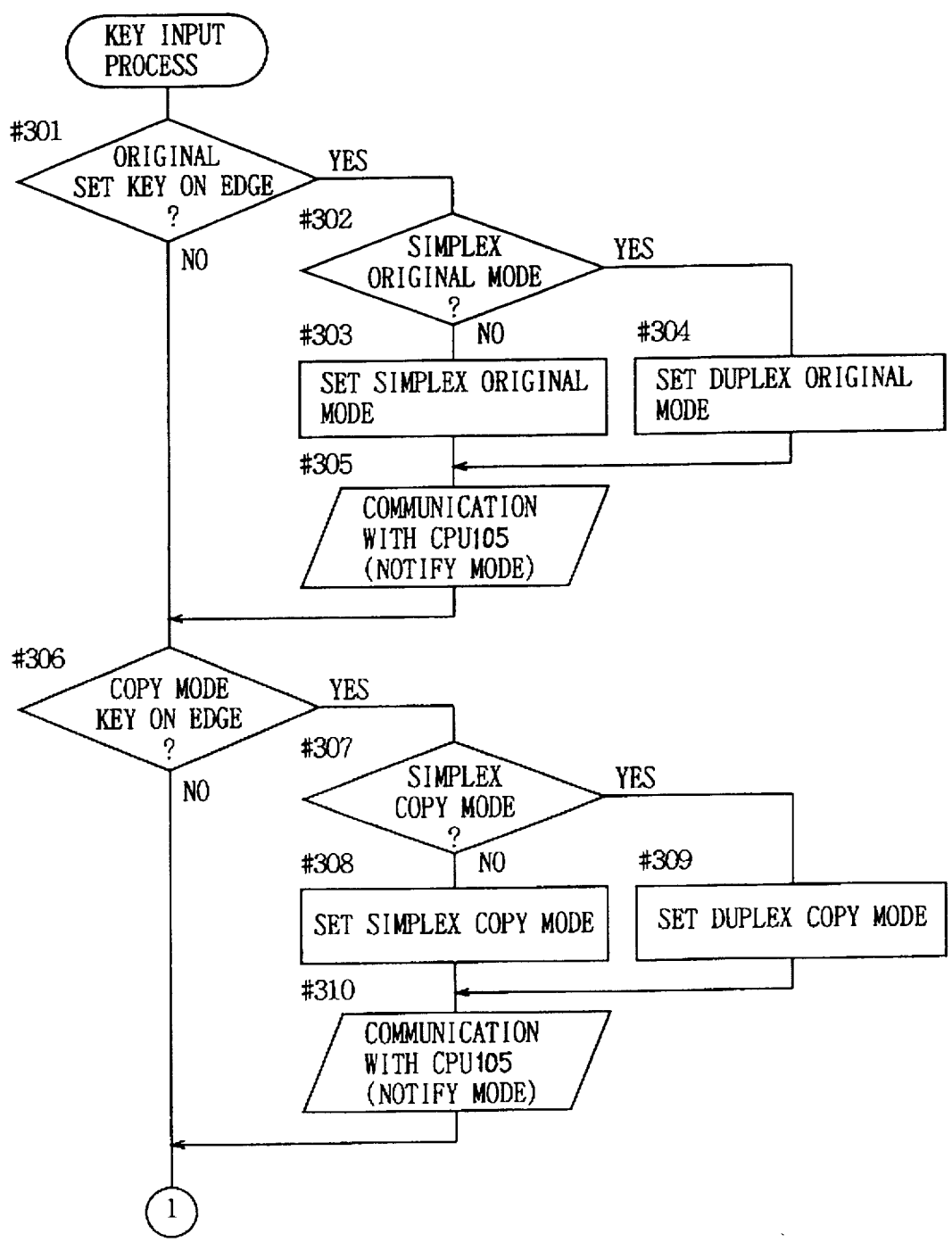
FIGS. 12 and 13 are flow charts of a key input process.
Figure 13:
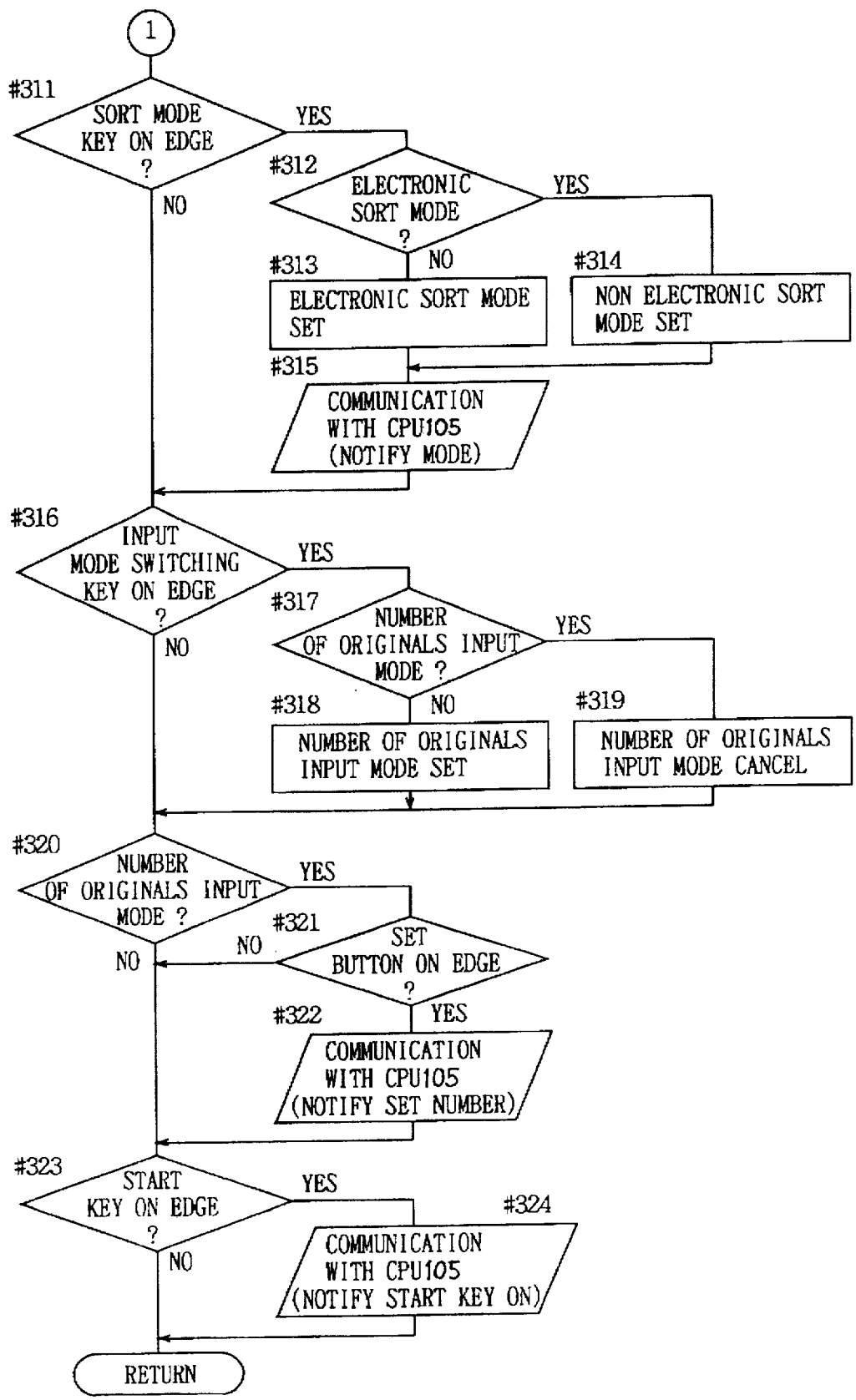

FIGS. 12 and 13 are flow charts of a key input process.

In response to a depression of original set key 100 (refer to FIG. 2), CPU 101 switches the original mode to the opposite mode. More specifically, if the original mode set at that time is a simplex original mode, it is switched to a duplex original mode. If the mode is a duplex original mode, the original mode is switched to a simplex original mode. The switched mode is notified to CPU 105 (#301–#305).

Similarly, in response to copy mode key 101 being turned on, the copy mode is switched to a simplex copy mode or a duplex copy mode. In response to finishing mode key 102, the sorting mode is switched to an electronic sorting mode or a non electronic sorting mode. The selected mode is notified to CPU 105 (#306–#315).

In response to input mode switching key 103 being turned on, the input mode specified at that time is switched. More specifically, if the input mode is a number of originals input mode, it is canceled. If the input mode is other than the number of originals input mode, the input mode is switched to the number of originals input mode (#316–#319).

When set button Z11 is turned on in a number of originals input mode, the number of originals specified by ten key 92 is notified to CPU 105 (#320–#322). Then, start key 96 is turned on, which is notified to CPU 105 (#323, #324).

Figure 14:
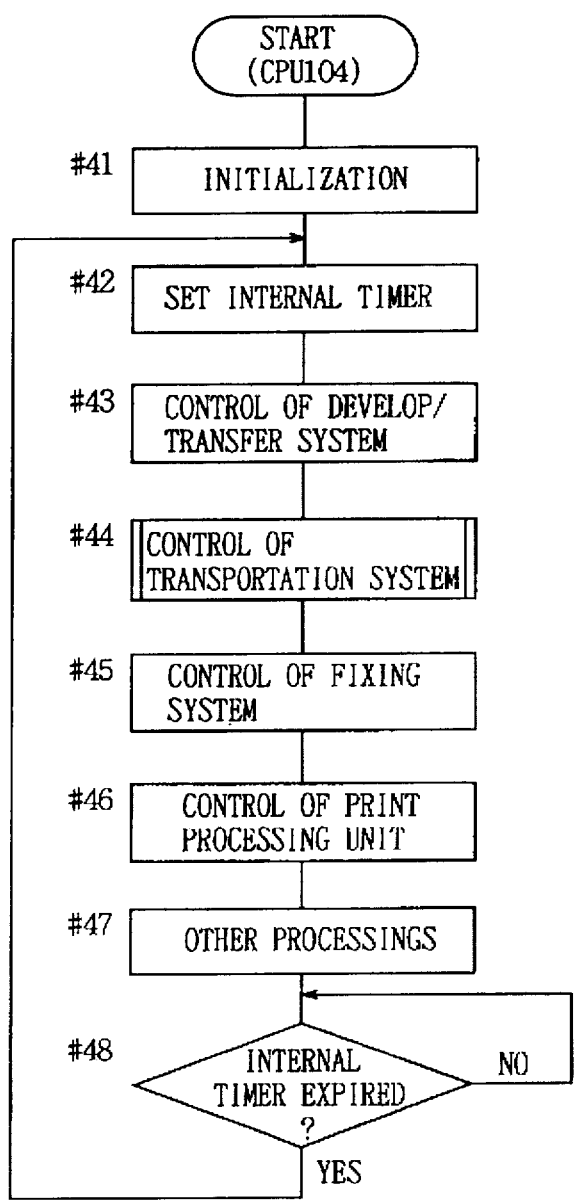
FIG. 14 is a CPU main flow chart that carries out control of the page printer.

FIG. 14 is a main flow chart of CPU 104 controlling page printer PRT.

CPU 104 carries out initialization (#41), followed by setting an internal timer (#42) controlling the developing and transfer systems (#43), controlling the transportation system (#44), controlling the fixing system (#45), controlling the print processing unit (#46), carrying out other processes (#47), and stand-by of expiration of the internal timer (#48). The steps of #42–#48 are repeated.

Figure 15:
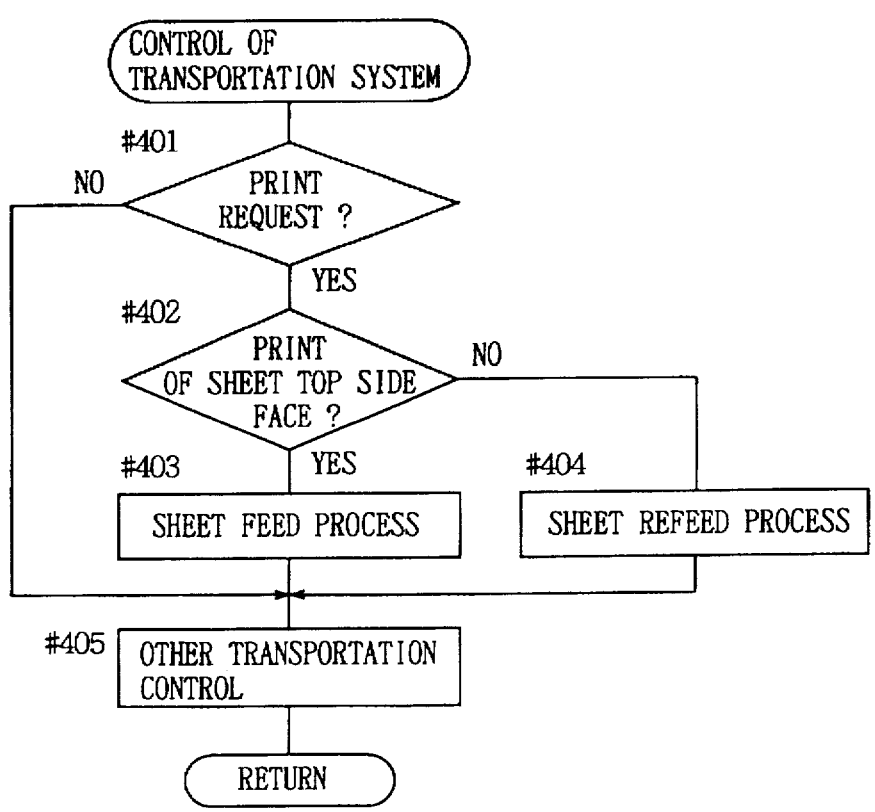
FIG. 15 is a flow chart of the control of the transportation system of FIG. 14.

FIG. 15 is a flow chart of the control of the transportation system of FIG. 14.

CPU 104 first checks the presence of a print request from CPU 105 (#401). If the print request is that towards the top side face (first face) of the sheet, a sheet is drawn out from the specified sheet cassette 80a or 80b to be subjected to a sheet feed process to be provided to a transfer position (copy position) (#402, #403). When the print request is that towards the back side of the sheet (second face), a sheet refeeding process (#404) is carried out to circulate the sheet by sheet refeeding unit 600. Following the execution of another transportation control process (#405), the control returns to the main routine.

Figure 16:
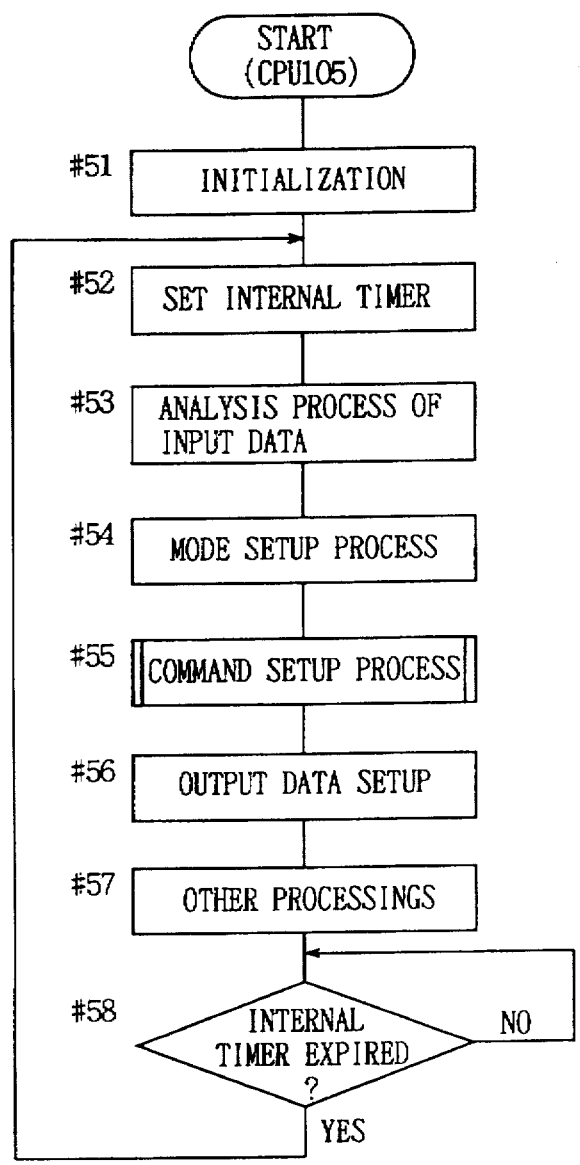
FIG. 16 is a CPU main flow chart that generalizes the control of the copy machine.
Figure 17:
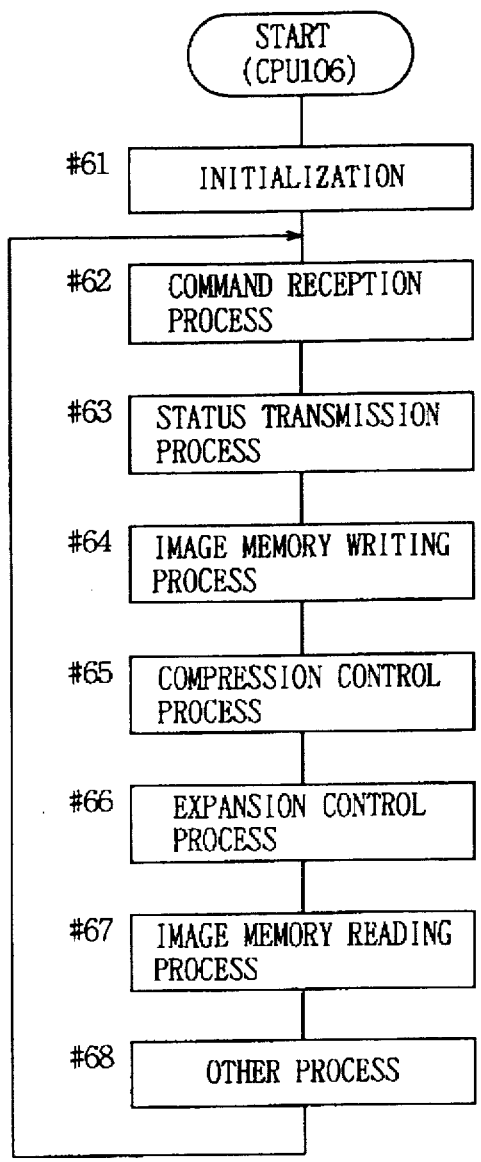
FIG. 17 is a CPU main flow chart that carries out control of a memory unit.

FIG. 16 is a main flow chart of CPU 105 generally controlling copy machine 1. FIG. 17 is a main flow chart of CPU 106 controlling memory unit 30.

CPU 105 carries out initialization (#51), followed by setting of an internal timer (#52), input data analysis process (#53) for checking input data from other CPUs, a mode SET UP process (#54) for setting an operation mode according to the operation, a command SET UP process (#55) for setting a command according to the mode, setting of output data (#56) to be queued at a communication port (#56), other processes (#57), and stand-by of expiration of the internal timer (#58). The steps of #52–#58 are repeated.

CPU 106 carries out initialization (#61), followed by repetition of a command reception process (#62), a status transmission process (#63), an image memory write process (#64), a compression control process (#65), an expansion control process (#66), an image memory reading process (#67), and other processes (#68).

Figure 18:
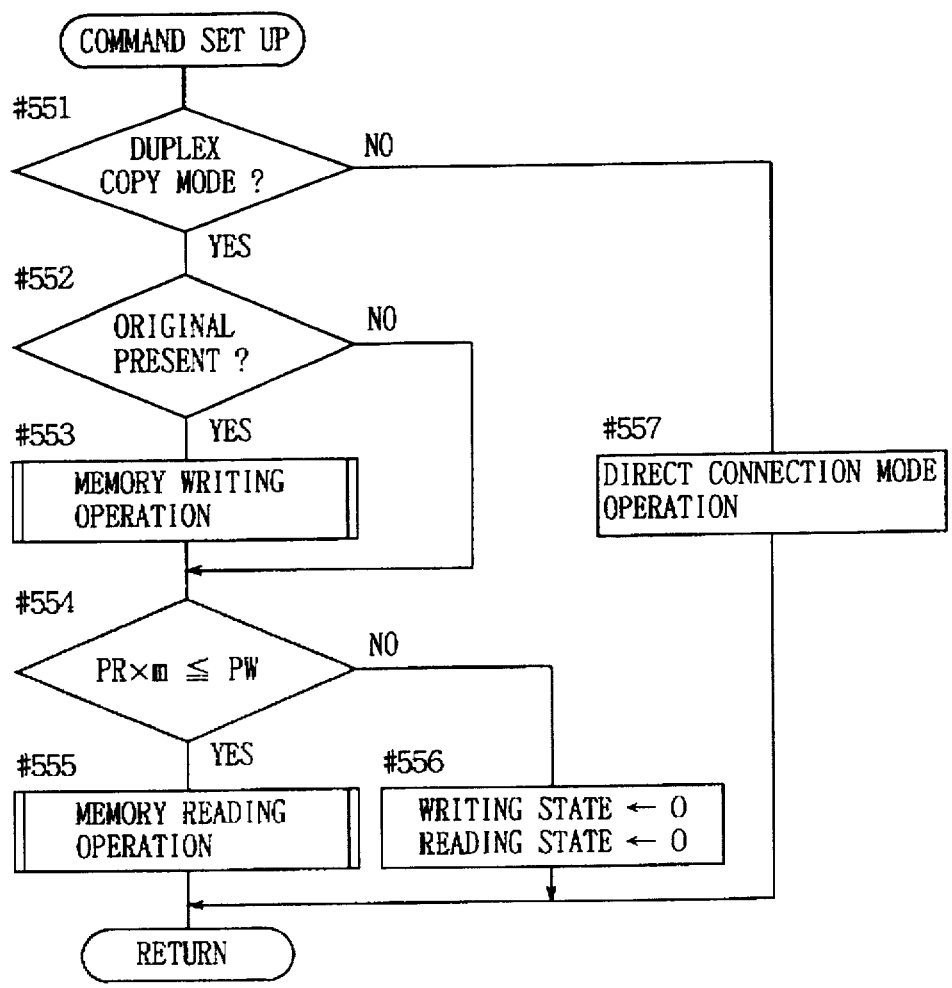
FIG. 18 is a flow chart of a command set up process of FIG. 16.

FIG. 18 is a flow chart of the command set up process of FIG. 16.

When not in a duplex copy mode (i.e. in a simplex copy mode), a command is set (#551, #557) for the operation of a direct connection mode where image data is substantially transferred from image signal processing unit 20 to print processing unit 40 without passing memory unit 30.

In the case of a duplex copy mode, the presence of an original to be read out is checked (#552) according to a report from CPU 107 indicating the detection result of image sensor SE50. If there is an original, the above-described process for memory mode writing operation is carried out. Then, the input/output state of image data from memory unit 30 to print processing unit 40 is checked (#553, #554).

More specifically, this check includes the comparison of a variable (PR×m) with a variable PW. Variable PW indicates the number of pages of image data stored in memory unit 30 (the number of original images). Variable PR indicates the number of pages of image read out from memory unit 30. Variable m is the number of combining images (m-in-1 copy), indicating the number of original images to be combined as 1 page of image on a sheet. General copying is carried out when m is "1". More specifically, an original image of 1 page (for example, the image of one simplex original) is copied on one side of the sheet at a predetermined magnification. When m is "2", original images of two pages (two simplex originals, or one duplex original) are copied on one side of one sheet with no overlapping therebetween. When m is "4", original images of 4 pages are copied on one side of one sheet. In other words, variable m indicates the number of original images to be printed on one side of one sheet, and variable (PR×m) indicates the total number of original images read out from code memory 306 as the subject to be printed out.

When variable (PR×m) does not exceed variable PW, i.e. when there is image data remaining in code memory 306 to be read out, CPU 105 sets the above-described memory mode reading operation (#555). When variable (PR×m) exceeds variable PW, the writing state and reading state indicating the advance of a memory mode operation to CPU 106 is returned to "0" (#556).

Figure 19:
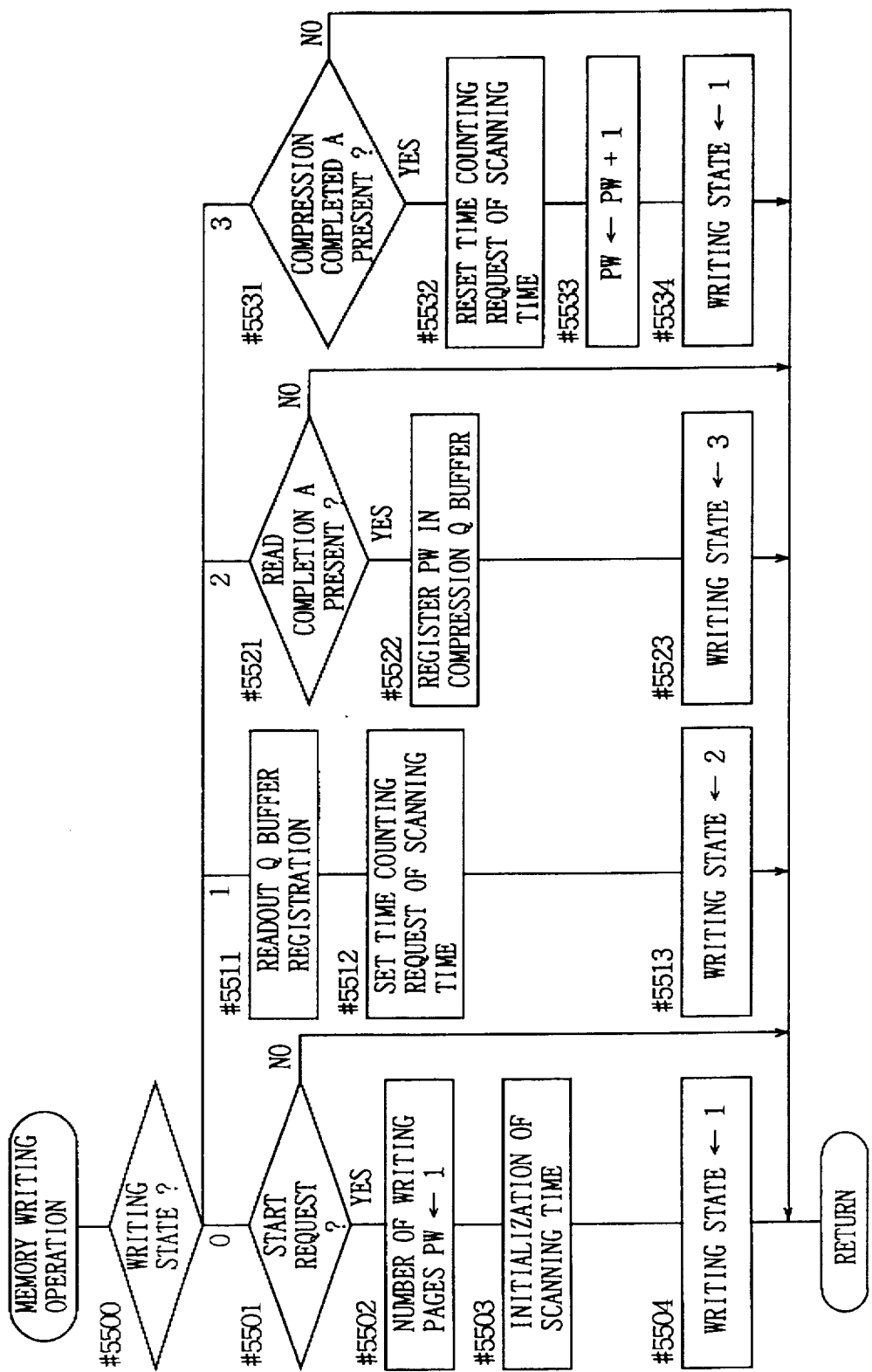
FIG. 19 is a flow chart of a memory writing operation of FIG. 18.

FIG. 19 is a flow chart of a memory writing operation of FIG. 18.

In the present routine, the writing state is first checked (#5500), and the following processes are executed according to each state ("0"–"3").

In state "0", the presence of a start request according to start key 96 being turned on is checked (#5501). If there is a start request, variable PW (the written number of pages of image data) is set to the initial value of "1". The timer count value indicating the scanning time per 1 page is initialized, and the value of the state is incremented to "1" (#5502–#5504).

In state "1", the readout command is registered in a buffer dedicated for commands (#5511). A command buffer (Q buffer) is prepared in advance for each command. Each command is transferred from a Q buffer to a communication port in the above-described output data set up (step #56 in FIG. 16).

A time count request instructing measurement of the scanning time per 1 page is set with respect to CPU 103, and the state advances to "2" (#5512, #5513). The scan time is used for setting the timing of sheet transportation as will be described afterwards.

In state "2", a read completion report (read completion A) is received from CPU 106 and CPU 102. The value of variable PW is registered in compression Q buffer, and the value of the state is incremented to "3" (#5521–#5523).

In state "3", upon receiving a compression completion report (compression completed A) from CPU 106, the time count request of the scanning time is reset (#5531, #5532). The variable PW is incremented by 1, and the value of the state is returned to "1" (#5533, #5534). Thus, the operation of compressing the readout original image and writing the compressed data to code memory 306 is repeated while there is an original remaining in original stacker 510.

Figure 20:
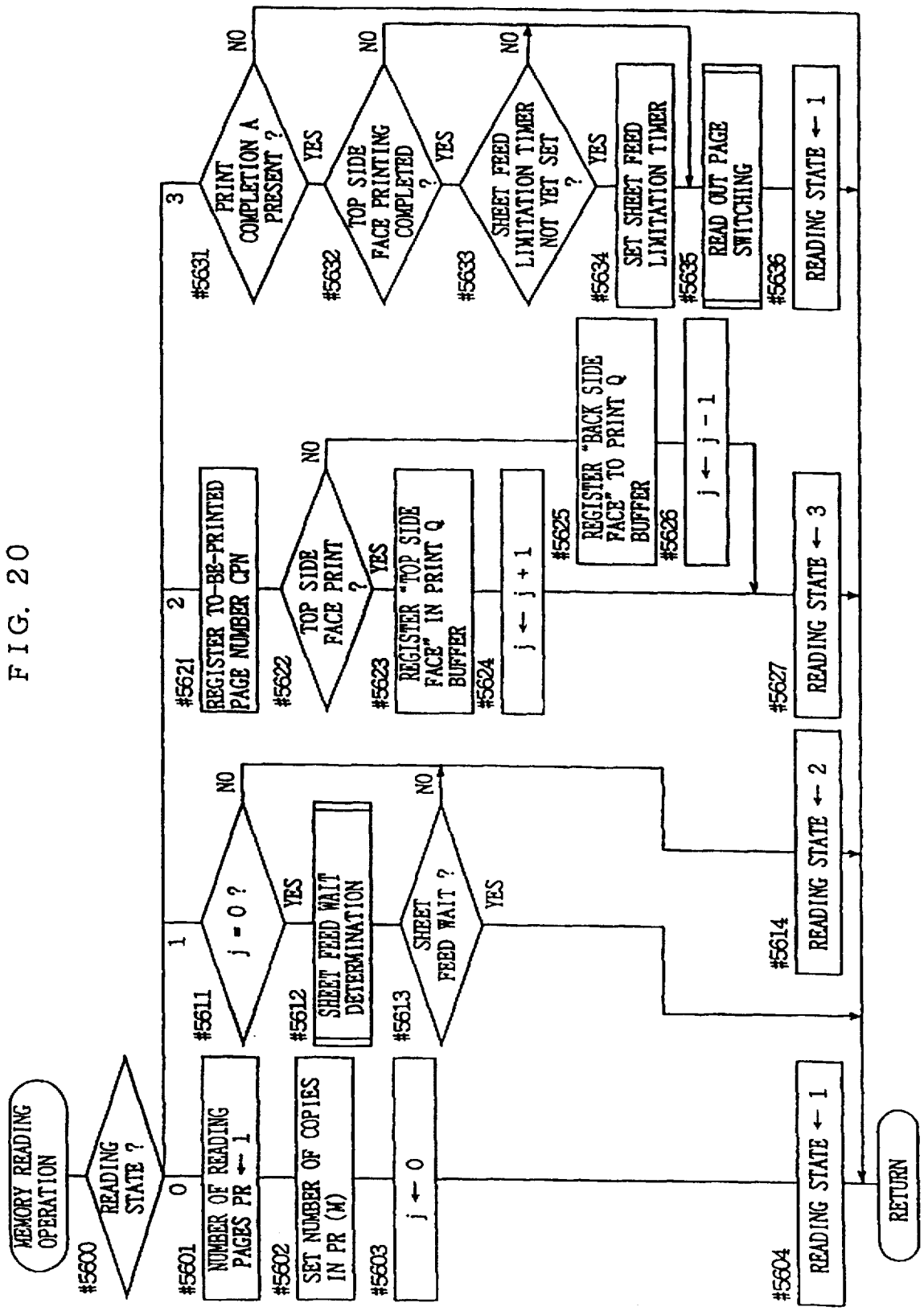
FIG. 20 is a flow chart of a memory reading operation of FIG. 18.

FIG. 20 is a flow chart of a memory reading operation of FIG. 18.

In this routine, the reading status is first checked (#5600), and the following processes are executed according to each state ("0"–"3").

In state "0", variable PR (the readout number of pages of image data) is set to the initial value of "1", and the number of required copies M specified by the operator is set in variable PR (M) indicating the number of times of reading out image data of the same page (#5601, #5602). Variable PR (M) is decremented by 1 at every readout of image data of the same page. When this value becomes "0", the number of copies required for the relevant page is completed.

The variable j indicating the number of sheets in the circulation path (the number of queuing sheets to be refed) is set to the initial value of "0" (#5603). The value of the state is advanced to "1" (#5604). The circulation path is the sheet transportation path from the transfer position to timing roller 82 via sheet refeeding unit 600.

In state "1", the number of queuing sheets for refeed j is checked (whether j is "0" or not: #5611) to make determination whether the next printing to be carried out is the first print of the first sheet (the first print of a duplex copy).

When j is "0", the sheet feed wait determination process which is a feature of the present invention is carried out. A check is made whether the result indicates the presence of a "sheet feed wait" (#5612, #5613). More specifically, a check is made whether a process of delaying the timing of feeding the first sheet in each circulation (sheet feed wait) is effective for reducing the time required for duplex copying in order to maximize the circulating number of sheets for each circulation.

When the presence of a sheet feed wait is indicated, the value of the state is not updated, and the control returns to the main routine. When a sheet is already fed (when the value of j is not "0"), and when the result of the sheet feed wait determination indicates that there is no sheet feed wait, the value of the state is advanced to "2" (#5614).

In state "2", the to-be-printed page number CPN (the page number of data to be read out from code memory 306) is registered in expansion Q buffer (#5621). If in a 2-in-1 mode, image data of 2 pages will become the interest of printing.

When the next printing is to be carried out on the top side face (first face) of a sheet, "top side" is registered in print Q buffer, and the value of j is incremented. Then, the state advances to "3" (#5622–#5624, #5627). If the next print is to be carried out on the back side of a sheet (second face), "back side face" is registered in print Q buffer, and the value of j is decremented. Then, the value of the state is updated (#5625–#5627). Feeding or refeeding a sheet is carried out as described above according to the registered contents of print Q buffer (refer to FIG. 15).

In state "3", a print completion report (print completion A) is received from CPU 104. If printing of the top side face (first face) is completed and the sheet feed limitation timer is not yet set, the sheet feed limitation timer is set and a readout page switching process is executed. Then the state returns to the value of "1" (#5631–#5636). The readout page switching process is executed and the value of the state updated also in the case when printing of the back side face (second face) is completed.

Sheet feed limitation timer serves to provide an appropriate interval between the sheets so they will not overlap each other (sheet feed interval) when a plurality of sheets are continuously transported.

Figure 21:
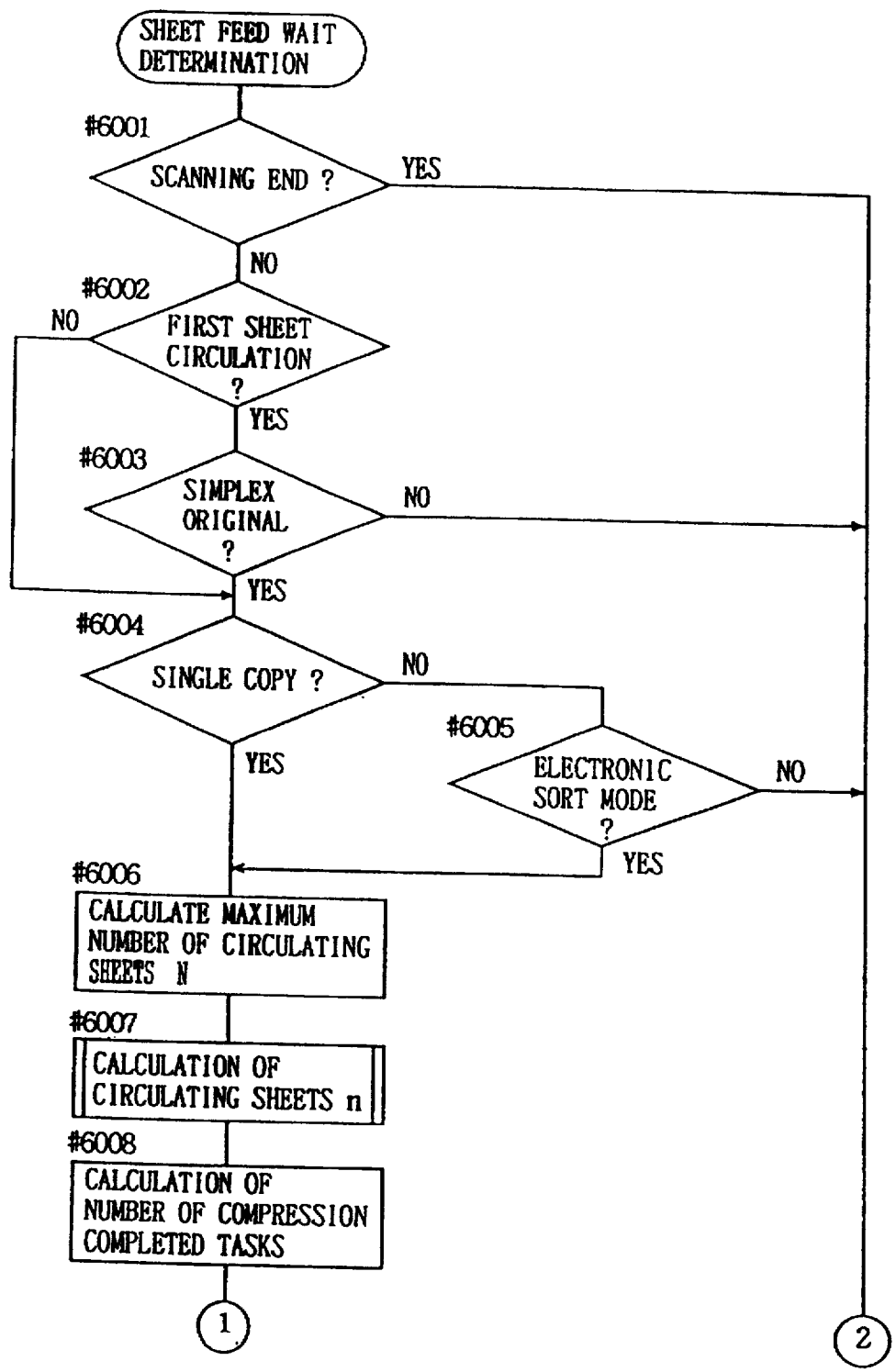
FIGS. 21 and 22 are flow charts of a sheet feed wait determination of FIG. 20.
Figure 22:
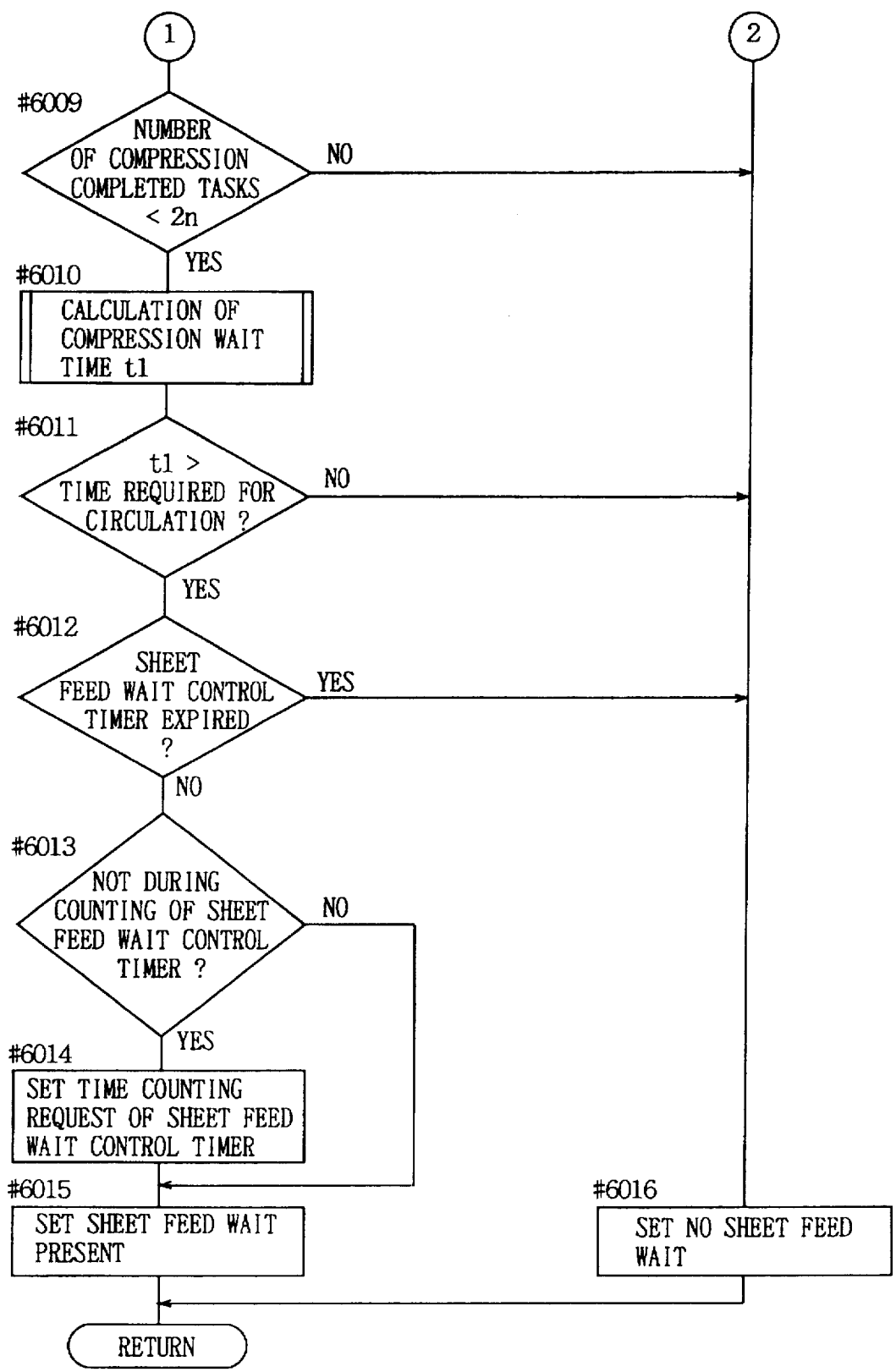

FIGS. 21 and 22 are the sheet feed wait determination flow charts of FIG. 20.

First, a check is made whether scanning of all the originals (strictly, storage of original images) is completed or not (#6001). If scanning is completed, image data can be read out from code memory 306 at an arbitrary order to be printed out. In this case, "no sheet feed wait" is set, and the control returns to the memory read operation flow of FIG. 20 (#6016).

When the scanning is not yet over, it is necessary to determine whether a sheet feed wait is required or not according to various conditions.

First, a check is made (#6002) whether it is the first sheet circulation, i.e. whether the next printing is the first printing in duplex copying (printing on the top side face of the first sheet).

If it is the first sheet circulation, a check is made (#6003) whether the original is a simplex original or not (the operated state of original set key 100). In the case of a duplex original, the original must be turned to the opposite side between the scanning of the top side face of the original and the scanning of the back side face of the original. This means that the scanning time per 1 page is longer than that of a simplex original. If a waiting is conducted for the completion of scanning of predetermined pages to reduce the number of times of circulation, the entire time for duplex copying will increase. Therefore, the sheet feed wait for the first sheet circulation is carried out only when the original is a simplex original.

Then, the number of copies M is checked (#6004). If a single copy that prints out only once an original image is not specified (i.e. if a multi-copy is set), a check is made whether an electronic sort mode for discharging the sheets in sorted groups is set or not (#6005). In the case of a multicopy in a non electronic sort mode, the same original image is continuously printed out for M copies. Therefore, a sheet feed wait is not required since the scanning of the next original image is completed during the printing of the previous one original image.

In the case of a single copy or a multi-copy in an electronic sort mode, i.e. when a plurality of sequentially read out original images are divided into even numbered pages and odd numbered pages and alternately printed out for every number of circulating sheets, the following process is executed.

The number of sheets N that can be fitted within a circulation path (the maximum number of circulating sheets) is calculated (#6006) according to the length of the specified size of sheet in the subscanning direction and the sheet refeeding conditions provided in advance (circulation path length L, sheet interval d). Also, the number of sheets n to be actually circulated (the number of circulating sheets) is calculated (#6007) taking into consideration the number of original pages and the number of combining images m in an m-in-1 copy.

Then, the number of compression completed tasks is calculated (#6008) according to the state of code memory 306. A check is made (#6009) whether the number of compression completed tasks is smaller than two times the number of circulating sheets n (i.e. 2n). Here, a task implies an original image to be printed out on one side of a sheet. In a 2-in-1 copy, for example, original images of two pages is equal to 1 task. A compression completed task is the task written into code memory 306.

When the number of compression completed tasks is greater than two times the circulating number of sheets n (2n), the original image to be printed out is already stored in code memory 306, and printing out the number of circulation sheets is possible. Therefore, a sheet feed wait is not required.

When the number of compression completed tasks is smaller than 2n, a compression wait time t1 (sheet feed wait time), which is the time required for compressing the original image to be printed out, is calculated (#6010) on the consideration that m times the normal time period is required in a m-in-1 copy. Then, the compression wait time t1 and the time required for circulation are compared (#6011).

When compression wait time t1 is shorter than the time required for circulation, compression of image data to be printed out onto the back side is completed during circulation of the sheet. More specifically, image data is ready to be read out at the time of printing the back side even when the sheet is fed directly without any delay. Therefore, the data from image reader IR will be on time without hindrance to printing.

It is to be noted that a copy cannot be carried out if image data for an opposite side is not yet obtained at the time of refeeding the sheet. In a circulation type sheet transportation, a fed sheet will be transported with no stop during each transportation. If the output of image data is not in time for the print out timing, the feeding of the sheet must be postponed. However, reducing the number of circulating sheets n below the maximum number of circulating sheets N will increase the times of circulations to degrade productivity. For example, when the circulation path length (the travel distance of a sheet—sheet length) is 1449 mm, the sheet interval is 84 mm, and the transportation speed is 165 mm/s, the time required for copying is increased by approximately 8.3 s for every increase of one circulation.

Copy machine 1 is directed to reduce the number of times of circulation so as to circulate the maximum number of circulating sheets N by delaying the start timing of a continuous sheet feed of the sheets to be circulated within a range in which the total time required for copying starting from start key 96 being turned on until the discharge of the last sheet is minimized.

More specifically, in step #6010, sheet feed wait time t1 is set so that the number of circulating sheets is maximized and the number of circulation is minimized. When this sheet feed wait time t1 is longer than the time required for circulation, the entire time required for copying will become longer due to delaying sheet feed. In such a case, a timer is set at step #6014 for minimizing the entire copy time period.

When compression wait time t1 is longer than the time required for circulation in #6011, determination is made whether the sheet feed wait control timer has completed its count (#6012). The time required for the time counting of this sheet feed wait control timer is the above-described time required for circulation.

If the sheet feed wait control timer has not yet expired and is not during a counting operation, a time count request of the sheet feed wait control timer is set to CPU 104 (#6012–#6014). Then, "sheet feed wait" is specified, and the control returns to the memory reading operation flow of FIG. 20 (#6015).

Figure 23:
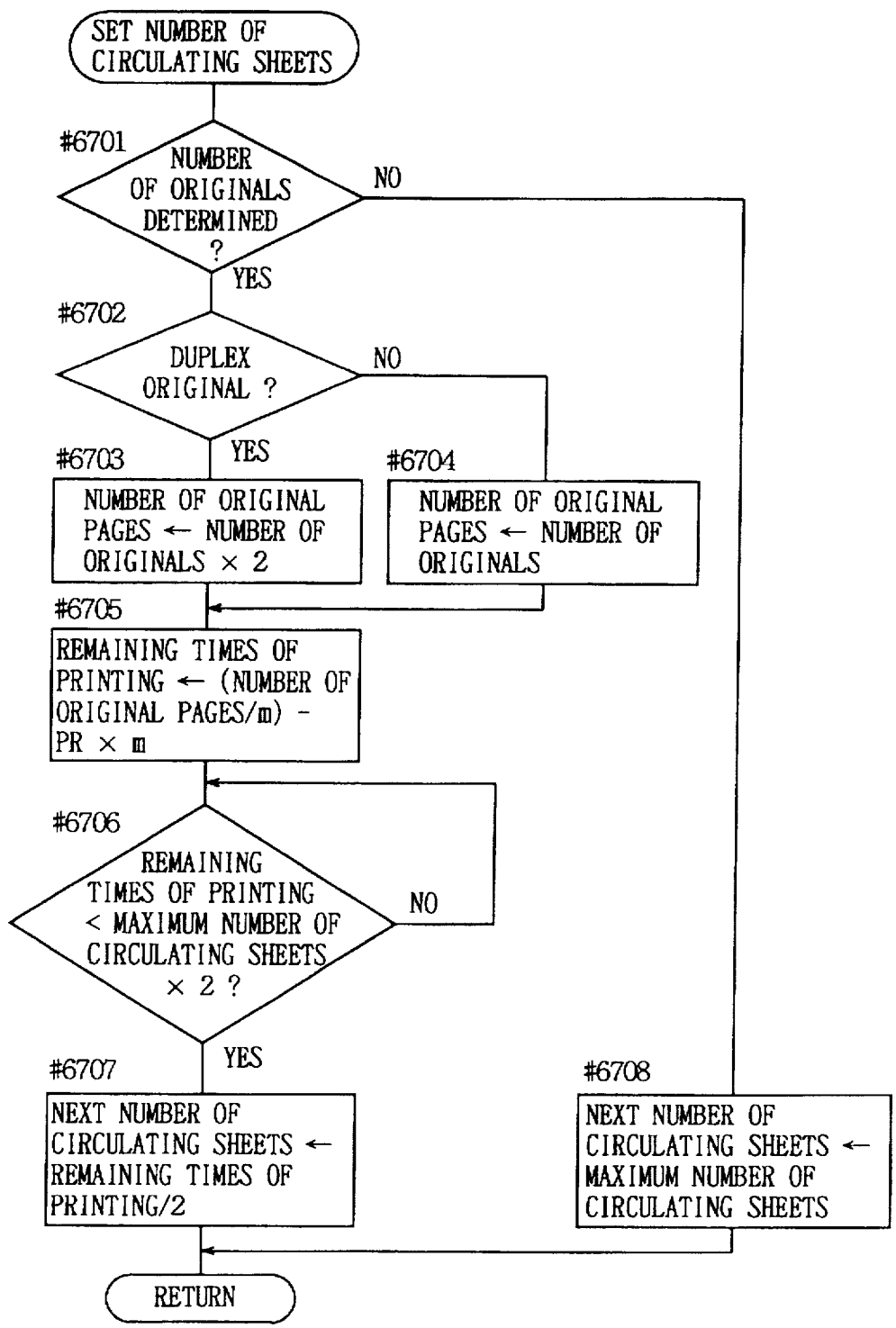
FIG. 23 is a flow chart of setting the number of circulation sheets of FIG. 21.

FIG. 23 is a flow chart of the calculation of the number of circulating sheets of FIG. 21.

First, a check is made whether the number of originals is determined or not (#6701). The number of originals is entered by ten key 92. The number of original is determined when original sensor SE50 attains an off state from an on state.

When the number of original pages is not yet determined, the maximum number of circulating sheets N is set as the next number of circulating sheets n (#6708). When the number of original pages is determined, the number of circulating sheets n is set taking into account a m-in-1 copy as set forth in the following.

In the case of a duplex original, a value two times the number of originals is set as the number of original pages (the number of original images). In the case of a simplex original, the value of the number of original is set as the number of original pages (#6703, #6704).

Then, [(number of original pages/m)−PR×m] is set as the remaining number of times of printing (#6705). "m" is the number of original images to be printed on one side of a sheet.

When the remaining times of printing is smaller than two times the maximum number of circulating sheets N, (the remaining times of printing/2) is set as the circulating number of sheets n (#6707). As a result, the compression wait time is reduced to advance the timing of sheet feeding.

Figure 24:
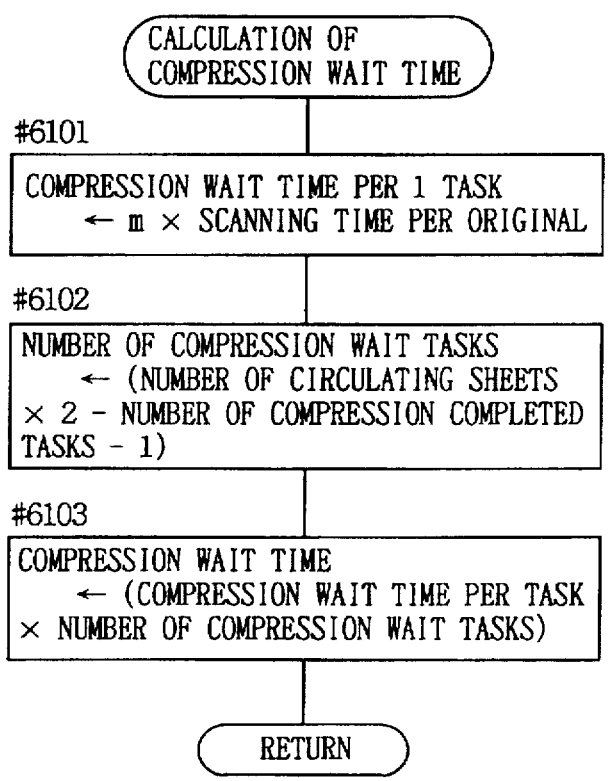
FIG. 24 is a flow chart of a calculation process of a compression wait time of FIG. 22.

FIG. 24 is a flow chart for calculating the compression wait time of FIG. 22.

When in a m-in-1 copy mode, m times of scanning is required to obtain image data of 1 task. Therefore, [m×scanning time per 1 original] is set as the compression wait time per 1 task (#6101).

Then, [number of circulating sheets n×2−number of compression completed tasks−1] is set as the number of compression waiting tasks. [Compression wait time per 1 task× number of compression waiting tasks] is set as compression wait time t1 (#6102, #6103).

Figure 25:
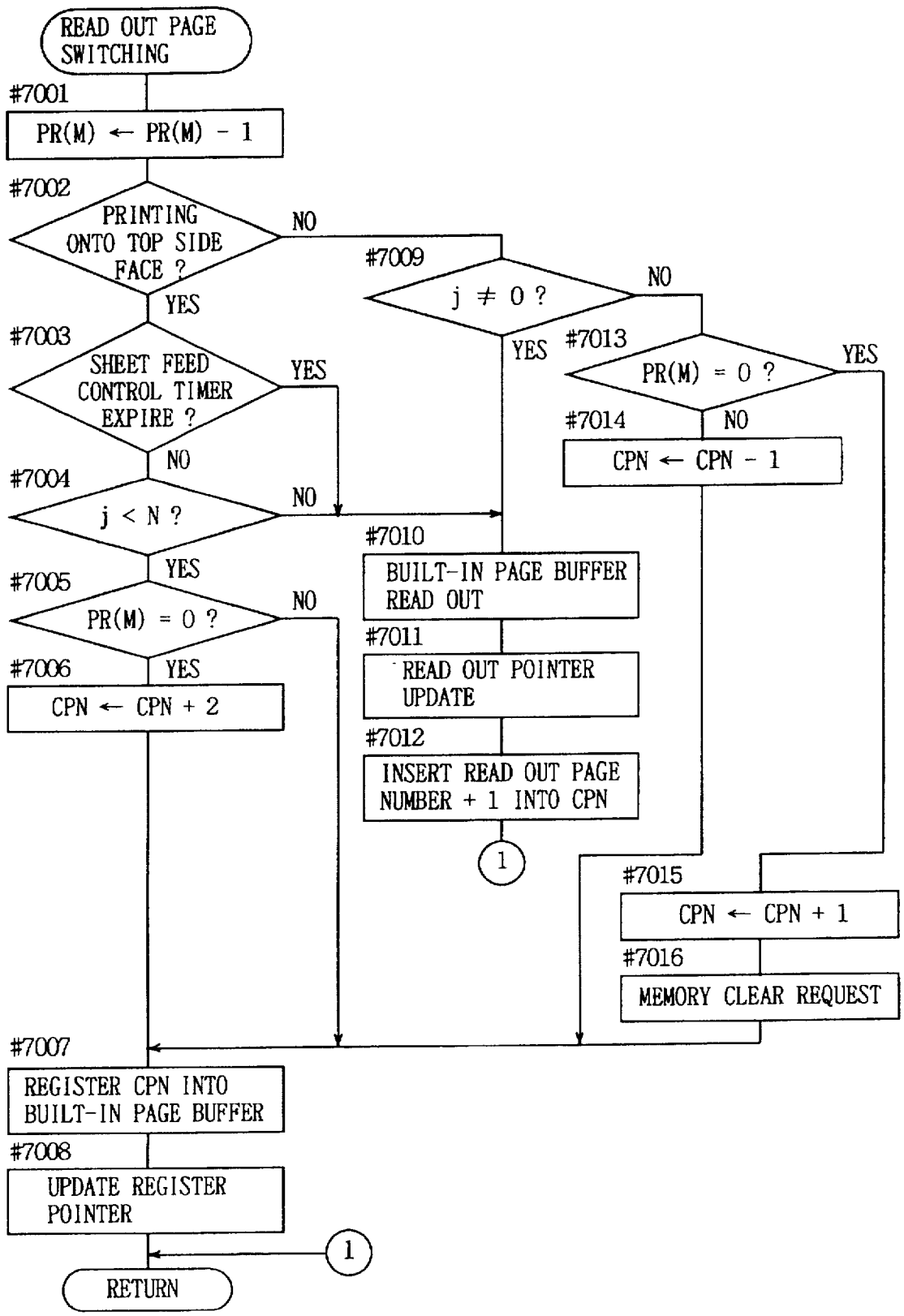
FIG. 25 is a flow chart of a reading page switching process of FIG. 20.

FIG. 25 is a flow chart of a reading page switching process of FIG. 20.

Variable PR (M) indicating the remaining times of multicopy is decremented, and a check is made whether the immediate preceding printing was carried out onto the top side face of a sheet or not (#7001, #7002).

In the case of printing onto the top side (first face), the number of queuing sheets for refeed j and the maximum number of circulating sheets N is compared during counting of the sheet feed limitation timer (#7003, #7004). When j is smaller than N and feeding of a new sheet is allowed, a check is made whether variable PR (M) is "0" or not (#7005). More specifically, a check is made whether the times of printing corresponding to a specified number of copies M has completely ended for the original images of the same page.

If variable PR (M) is "0", "2" is added to the to-be-printed page number CPN for printing the next image onto the top side face of a sheet (#7006). If variable PR (M) is not "0", the current to-be-printed page number CPN is maintained to print out the same image.

In the transition from the top side face to the back side face, the value of the to-be-printed page number CPN is registered in a ring buffer type built-in page buffer (#7007) to retrieve the page of the back side, and the registration pointer is updated (#7008). The built-in page buffer and registration pointer will be described afterwards.

When j equals N at step #7004, the smallest page number of the pages having the top side already printed is read out from built-in page buffer (#7009, #7010); the readout pointer is updated (#7011); and the value of "1" added to the page number readout at step #7010 is set as the to-be-printed page number CPN (#7012).

When the sheet feed limitation timer has expired at step #7003, the control proceeds to step #7010. Thus, code data stored in code memory 306 is read and printed out as soon as possible, whereby the control moves to the readout of the next original.

When printing is to be carried on the back side as detected at step #7002, a check is made whether the number of queuing sheets for refeed j is "0" or not, i.e. whether there is a sheet left in the circulation path on which printing to the back side is to be carried out (#7009).

When there is a sheet still left, the control proceeds to step #7010. When there is no remaining sheet, a check is made whether variable PR (M) is "0" or not (#7013). If variable PR (M) is not "0", it is necessary to carry out printing onto the top side face. Therefore, the to-be-printed page number CPN is decremented by 1 (#7014), and the control proceeds to step #7007. The decremented value of CPN is registered into the built-in page buffer.

When variable PR (M) is "0", the M printouts of the same image is completed. The value of CPN is incremented so as to proceed to printing of the next image (#7015). At #7016, a memory clear request is set to instruct erasure of unrequited image data to CPU 106. Then the control proceeds to step #7007 where the incremented value of CPN is registered in the built-in page buffer.

Figure 26:
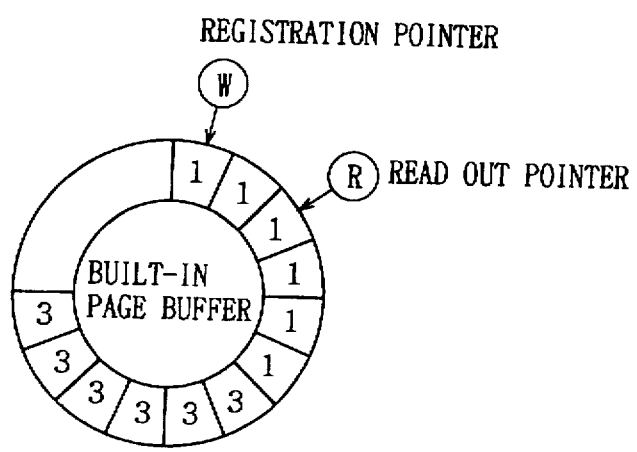
FIG. 26 shows a structure of a built-in page buffer.

FIG. 26 shows a structure of a built-in page buffer PBF. FIGS. 27a–27b and 28a–28d show the state transition of built-in page buffer PBF. The operation of built-in page buffer PBF will be described hereinafter.

In the above-described step #7007, only the to-be-printed page numbers CPN of odd numbers are registered in built-in page buffer PBF. Each pointer is sequentially updated clockwise.

It is assumed that there are four simplex originals (page 1–4), the memory (code memory 306) capacity is 5 pages, the number of copies N is 6, and the maximum number of circulating sheets N is 10.

In reading originals, i.e., the writing into the memory is carried out in the order of 1 (page), 2, 3, and 4. The print out to a sheet is carried out in the order of 1, 1, 1, 1, 1, 1, 3, 3, 3, 3, 2, 2, 2, 2, 2, 2, 4, 4, 4, 4, 3, 3, 3, 4, 4. Although it is possible to write all the four originals into the memory, the number of queuing sheets for refeed j is 10 at the fourth print out of page 3 (top side face) in which the circulation path is full since the maximum number of circulating sheets is N. Therefore, page 2 (back side) and page 4 (back side) are printed, and then the remaining two pages of page 3 and page 4 are printed out.

Figure 27A:
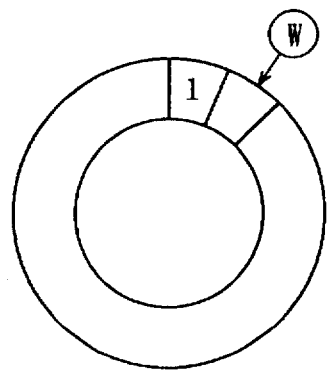
FIGS. 27a–27e and FIGS. 28a–28d show the state transition of a built-in page buffer.
Figure 27B:
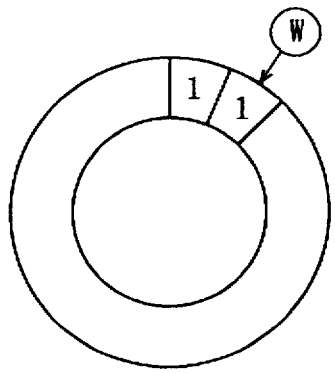
Figure 27C:
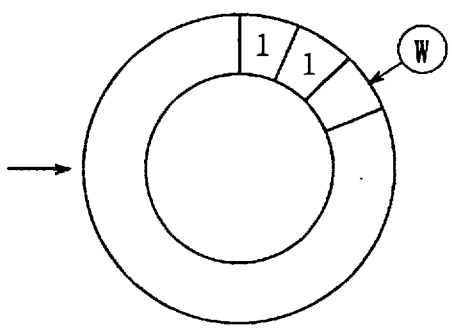
Figure 27D:
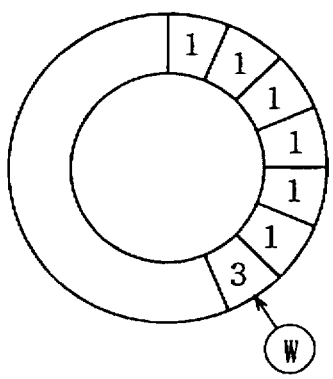
Figure 27E:
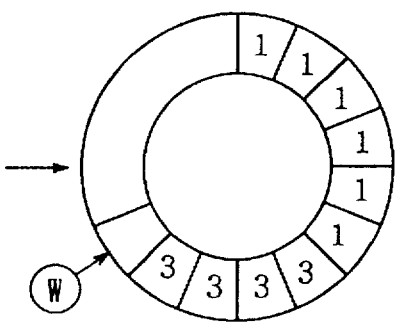

In built-in page buffer PBF at the initial state shown in FIG. 27a, the value of "1" for CPN is registered into the position indicated by registration pointer W (FIG. 27b), and registration pointer W is updated (FIG. 27c). By repeating these steps, page number CPN is written into built-in page buffer PBF.

Figure 28A:
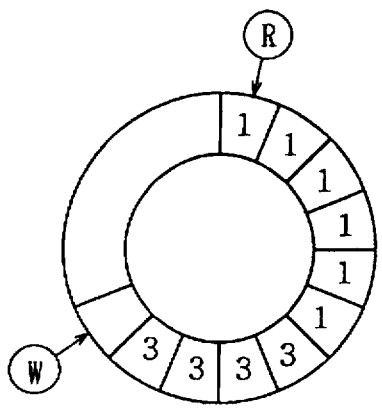
Figure 28B:
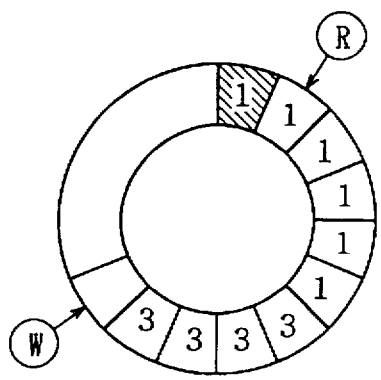
Figure 28C:
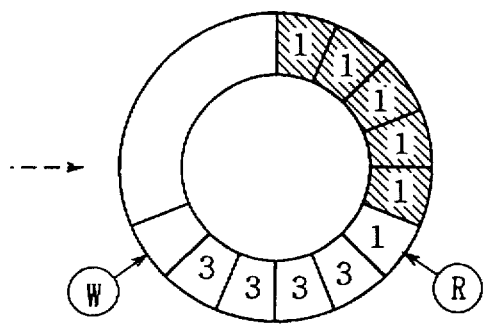
Figure 28D:
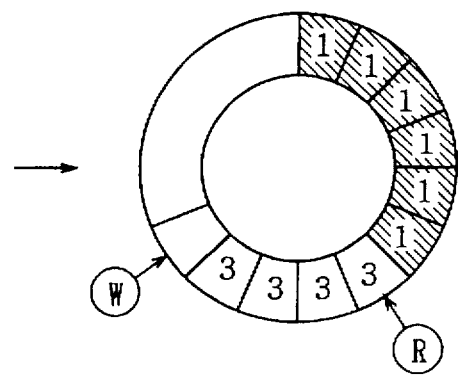

At step #7010, the smallest page number of the printed pages is read out at every printout onto a top side face of one sheet (FIG. 28a). At step #7011, read pointer R is updated (FIG. 28b). By repeating these steps, the page number of the image to be printed on the top side is read out from built-in page buffer PBF. At step #7012, 1 is added to the readout page number. For example, page 1–page 2, and page 3–page 4. The page number of the back side corresponding to the top side is obtained.

According to the above-described embodiment, scanning and printing of an original are respectively carried out continuously as long as image data can be newly stored into code memory 306 and as long as the sheet circulation path is not full. Therefore, the waiting time for inverting and refeeding a sheet is reduced in comparison with the case where printing onto a top side and a back side is carried out for every one sheet in duplex copying. Therefore, the copy productivity can be improved significantly.

In the above-described embodiment, the timing of clearing data in code memory 306 may be carried out by sequentially clearing data of the page having the number of copies M printed out, and writing in image data of the next original into the cleared page region. Although image data obtained from an original is compressed and then stored into code memory 306 as code data, image data may be stored without being compressed.

When the number of originals is known in advance, the conditions for circulating the copy sheets at an optimum cycle can be identified. Therefore, the sheet feeding time may be determined upon checking these conditions.

The control according to the present invention is also applicable to combine copying.

Furthermore, the present invention is not limited to the above-described embodiment where the maximum number of circulating sheets is calculated, and the maximum number of circulating sheets according to a sheet size may be stored in advance in a memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

an original tray for holding a plurality of originals, a platen glass on which an original is mounted for image formation, automatic original transportation device for sequentially transporting a plurality of originals from said original tray onto said platen glass, image reading means for reading image of said original mounted on said platen glass for providing digital image corresponding to the density of each pixel in an original image, a first memory for storing said read image data of said original image, image formation means for forming an image on a sheet according to said image data read out from said first memory, a sheet transportation mechanism for circulating a plurality of sheets having an image formed on one side and sequentially refeeding the sheets to an image transfer position, detection means for detecting the size of a sheet used for image formation, confirmation means for confirming the number of sheets n (n≧2) of said sheet size detected by said detection means that can be circulated at one time by said sheet transportation mechanism, first calculation means for calculating the difference between the time when image formation of the (2n−1)th page of an original image can be initiated and the time when the n-th sheet is provided to said image formation position after the first sheet is provided at a normal timing in combine or duplex image formation using at least n sheets, and first control means for controlling the feeding timing of the first sheet according to the time difference calculated by said calculation means.

2. The image forming apparatus according to claim 1, wherein said confirmation means comprises second calculation means for calculating the maximum number of sheets of said detected size that can be circulated at one time by said sheet transportation mechanism from the length of a sheet circulation path of said sheet transportation mechanism and the sheet size detected by said detection means.

3. The image forming apparatus according to claim 1, wherein said confirmation means comprises
   a second memory for storing the allowable maximum number of sheets of each size that can be circulated in a sheet circulation path of said sheet transportation mechanism, and
   reading means for reading out the number of sheets stored in said second memory according to a detection result of said detection means.

4. The image forming apparatus according to claim 1, wherein said sheet transportation mechanism reverses a sheet having an image formed on a first face to the opposite side and then feeding that sheet to an image transfer position when image formation is to be carried out on both sides of said sheet.

5. The image forming apparatus according to claim 1, further comprising:
   input means for entering an image formation mode, determination means for determining whether said image formation mode entered by said input means is a selected image formation mode; and
   second control means for inhibiting delay of feeding a first sheet by said first control means when the image formation mode determined by said determination means is a selected image formation mode.

6. The image forming apparatus according to claim 5, wherein said second control means inhibits delay of feeding a first sheet by said first control means when determination is made that a multi image formation mode is set to form the same original image on a plurality of sheets, and when determination is made that an electronic sort mode is not selected.

7. The image forming apparatus according to claim 5, wherein said second control means inhibits delay of feeding the first sheet by said first control means when determination is made by said determination means that an image information using a duplex original is set.

8. The image forming apparatus according to claim 5, further comprising:
   third control means for determining an image formation sequence of n sheets during circulation by said sheet transportation mechanism according to the number of sheets n calculated by said calculation means and the image formation mode determined by said determination means.

9. The image forming apparatus according to claim 5, wherein said control means sets the time of delaying image formation initiation of the first sheet to m times that of forming an original image of one page on one side of a sheet, when the m-in-one image formation mode (m≧2) that forms original images of m pages on the same side of a sheet is selected.

10. The image forming apparatus according to claim 1, further comprising:
    comparison means for comparing the time calculated by said calculation means with the time required for circulation in which a sheet having an image formed on one side is refed to an image transfer position by said sheet transportation mechanism, wherein said first control means controls the feeding timing of the first sheet according to a comparison result of said comparison means.

11. The image forming apparatus according to claim 10, wherein said first control means does not delay the feeding timing of the first sheet when the time calculated by said calculation means is shorter than said time required for circulation as a result of comparison by said comparison means.

12. The image forming apparatus according to claim 10, wherein said first control means sets the time required for circulation as the upper limit of time for delaying provision of the first sheet when the time calculated by said calculation means is longer than said time required for circulation as a result of comparison by said comparison means.

13. An image forming apparatus comprising:
    image reading means for reading out an original image and providing digital data corresponding to the density of each pixel in said original image,
    a memory for storing image data of said readout original image,
    image formation means for forming an image on a sheet according to image data read out from said memory,
    first input means for entering an image formation mode,
    second input means for entering the number of originals prior to initiation of image formation,
    detection means for detecting the size of a sheet used for image formation,
    first calculation means for calculating the number of sheets n (n≧2) of a size detected by said detection means that can be circulated at one time by a sheet transportation mechanism,
    determination means for making determination of an image formation mode entered by said first input means,
    first control means for determining the optimum image formation sequence of image formation for all originals according to the number of originals entered by said second input means, the number of sheets n calculated by said first calculation means, and an image formation mode determined by said determination means,
    second calculation means for calculating all the differences between the time when image formation of the (2n−1)th page of an original image can be initiated before completion of the image formation of said all originals in the sequence determined by said first control means and the time when the n-th sheet is fed to said image formation position after the first sheet is provided at a normal timing,
    comparison means for comparing all the time differences calculated by said second calculation means, and
    second control means for delaying feeding of the first sheet according to a comparison result of said comparison means.

14. The image forming apparatus according to claim 13, wherein said second control means delays feeding of said first sheet for only the longest time period of all the time differences calculated by said second calculation means.

15. An image forming apparatus that allows image formation on a first face of a sheet and on a second face corresponding to the back surface of said sheet comprising:
    a reader to read an original image;
    a memory to store image data of a read out of said original image;
    an image former to form an image on a sheet fed to an image formation position according to image data read out from said memory;
    a circulation type sheet transporter having a transportation path that can accommodate n (n≧2) sheets to refeed a sheet to the image formation position after an image has been formed on the first face to invert the face of the sheet to the opposite side;
    a determination unit to determine whether image data required for a first operation of sequential image formation onto the second face of said n sheets circulated through said sheet transporter is stored in said memory; and a controller to control initiating image formation onto the first face of said first sheet according to a determination result of said determination unit.

16. The image forming apparatus according to claim 15 wherein said controller delays initiation of the image formation onto the first face of said first sheet if said determination unit determines that image data required to carry out said first operation is not stored.

17. The image forming apparatus according to claim 16, wherein said controller does not delay the timing of the initiation image formation onto the first face of said first sheet if said determination unit determines that image data required to carry out said first operation is stored.

18. The image forming apparatus according to claim 16, wherein said controller delays the initiation of image formation until the image data required to carry out said first operation is stored.

19. The image forming apparatus according to claim 15, wherein said image forming apparatus is in a duplex copy mode to form an image of one page of image data of an original image onto one side face of a sheet;

wherein the number of image data stored in said memory required to carry out said first operation is 2n at the time of initiating image formation onto the first face of the first sheet.

20. The image forming apparatus according to claim 15, wherein said image forming apparatus carries out duplex copy of m-in-one copy (m≧2) wherein the number of original images m is combined as one page of image on a sheet; and wherein the number of image data stored in said memory required to carry out said first operation is 2n times m at the time of initiating image formation onto the first face of said first sheet.

21. The image forming apparatus according to claim 15, further comprising:

a comparator to compare the delay time between the time needed for the image data required to carry out said first operation is stored in said memory with a normal time period measured from the start of sheet feed of the first face to the image formation position up to the time when the second face of said sheet reaches the image formation position; and wherein image formation is initiated without delay when determination is made by said determination unit that image data required to carry out said first operation is not stored, and a determination is made by said comparator that the normal time is shorter than the delay time.

22. The image forming apparatus according to claim 15, wherein said image forming apparatus carries out duplex copy forming an image of one page of image data of an original image on one side face of a sheet, and wherein said image formation is delayed when determination is made by said determination unit that the image data required to carry out said first operation is not stored, and the image formation is delayed until image formation of image data of an original of the (2n−1)th page can be carried out on the first face of the nth sheet.

23. The image forming apparatus according to claim 15, wherein said image forming apparatus is an image forming apparatus that carries out duplex copy of m-in-one copy (m≧2) wherein the number of original images m is combined as one page of image on a sheet, and wherein image formation is delayed when determination is made by said determination unit that image data required to carry out said first operation is not stored and is started only after image formation of image data of an original of the {(2n−1)×m}th page can be carried out on the first face of the nth sheet.

24. A method of forming an image on a first face and second face corresponding to a back surface of the first face, comprising the steps of:

reading out an original image;

storing image data of a read out original image into a memory;

forming an image on a sheet fed to an image formation position according to image data read out from said memory;

refeeding a sheet to the image formation position after conveying the sheet in sequential order through a transportation path that can accommodate n (n≧2) sheets and inverting the face of the sheet to an opposite side; and initiating image formation onto the first face of the first sheet after image data required for forming an image onto the second face of said n sheets circulated through said sheet transporter has been stored in said memory when it is desired that image formation is to be carried out on both the first face and the second face of at least n sheets.

25. An image forming apparatus comprising:

image reading means for reading an original image and providing digital data corresponding to the density of each pixel in said original image;

a memory for storing image data of said read original image;

image formation means for forming an image on a sheet according to said image data read out from said memory;

a circulation type sheet transportation mechanism including a transportation path of a length that can accommodate n (n≧2) sheets for inverting a sheet having an image formed on one side to the opposite side and refeeding the reversed sheet to an image formation position; and control means for controlling the feed timing of the first sheet so that the n-th sheet arrives at said image formation position after the point in time when image data has been stored of the original image of the (2n−1)th page can be initiated in order to set the number of sheets of the first circulation to n by said sheet transportation mechanism in duplex image formation using at least n sheets.

26. The image forming apparatus according to claim 25, wherein said control means delays the sheet feed timing of the first sheet.

* * * * *